US012705373B2

(12) United States Patent
Bogrett et al.

(10) Patent No.: US 12,705,373 B2
(45) Date of Patent: Aug. 11, 2026

(54) POLICY ENFORCEMENT IN A VIRTUAL DATABASE SYSTEM

(71) Applicant: Xactly Corporation, San Jose, CA (US)

(72) Inventors: Steven Ward Bogrett, Los Gatos, CA (US); Jeffrey Lee Stoerner, Basalt, CO (US)

(73) Assignee: Xactly Corporation, Los Gatos, CA (US)

( * ) Notice: Subject to any disclaimer, the term of this patent is extended or adjusted under 35 U.S.C. 154(b) by 84 days.

(21) Appl. No.: 18/778,213

(22) Filed: Jul. 19, 2024

(65) Prior Publication Data

US 2026/0023864 A1 Jan. 22, 2026

(51) Int. Cl.
*G06F 21/60* (2013.01)
*G06F 21/62* (2013.01)

(52) U.S. Cl.
CPC ........ *G06F 21/604* (2013.01); *G06F 21/6218* (2013.01); *G06F 2221/2113* (2013.01); *G06F 2221/2141* (2013.01)

(58) Field of Classification Search
CPC ........... G06F 21/604; G06F 2221/2141; G06F 2221/2113; G06F 21/6218
See application file for complete search history.

(56) References Cited

U.S. PATENT DOCUMENTS 7,185,357 B1 * 2/2007 Wong .................. G06F 21/6227
726/1
8,819,763 B1 * 8/2014 Cheung ................. H04L 63/083
726/1
9,330,140 B1 * 5/2016 Bogrett ............... G06F 16/2456
9,485,259 B1 * 11/2016 Doermann .......... G06F 21/6218
9,635,029 B2 * 4/2017 Staggs ................ G06F 21/6218
9,646,028 B2 * 5/2017 Schrock .................. G06F 16/28
9,973,536 B2 * 5/2018 Foley .................... H04L 63/105
10,645,120 B2 * 5/2020 Summers .............. G06F 21/604
10,824,591 B2 * 11/2020 Venkataraman ........ G06F 16/13
10,878,000 B2 * 12/2020 Vaquero Gonzalez ......................
G06F 16/25
10,965,714 B2 * 3/2021 Arumugam ......... H04L 63/0227
11,010,348 B2 * 5/2021 Ramesh ................ G06F 16/182
11,537,618 B2 * 12/2022 Gupta ................. G06F 16/2456
11,763,018 B2 * 9/2023 Ben-Natan ............ G06F 16/285
726/1
11,803,359 B2 * 10/2023 Roisman ................. G06F 8/427
(Continued)

*Primary Examiner* — Gary S Gracia
(74) *Attorney, Agent, or Firm* — Baker Botts L.L.P.

(57) ABSTRACT

A method for transacting data with a data repository via a virtual database system includes receiving a query comprising user metadata and a request for transacting data with one or more data repositories and parsing the query to create a command graph comprising one or more nodes and node-associated metadata, wherein each of the one or more nodes represents a command action for processing or transacting the data, and the node-associated metadata describes a behavior of the command action. Further, the method includes retrieving one or more policy rules based on the user metadata, applying security policies to the one or more nodes by updating the node-associated metadata, updating the command graph based on the updating of the node-associated metadata, and executing each of the command actions corresponding to the one or more nodes of the updated command graph.

19 Claims, 15 Drawing Sheets

(56) References Cited

U.S. PATENT DOCUMENTS

| | | | | |
|---|---|---|---|---|
| 11,940,951 | B2 * | 3/2024 | Buchmann | G06F 16/258 |
| 12,165,092 | B2 * | 12/2024 | Vasileiadis | G06Q 10/06 |
| 12,260,000 | B2 * | 3/2025 | Kirti | G06F 21/6245 |
| 12,335,267 | B1 * | 6/2025 | Samek | H04L 63/20 |
| 12,461,971 | B1 * | 11/2025 | Ghosh | G06F 16/9035 |
| 12,531,736 | B2 * | 1/2026 | Lim | H04L 9/0894 |
| 2011/0173231 | A1 * | 7/2011 | Drissi | G06F 16/24568 707/E17.014 |
| 2013/0326580 | A1 * | 12/2013 | Barclay | H04L 63/101 726/1 |
| 2014/0143214 | A1 * | 5/2014 | Kohl | G06F 16/00 707/694 |
| 2015/0281248 | A1 * | 10/2015 | Obbard | G06F 16/2365 726/1 |
| 2016/0134932 | A1 * | 5/2016 | Karp | G05B 13/04 348/207.11 |
| 2017/0126687 | A1 * | 5/2017 | Martinelli | G06F 21/6236 |
| 2017/0262531 | A1 * | 9/2017 | Bhattacharya | G06F 16/00 |
| 2017/0318058 | A1 * | 11/2017 | Vahlis | G06F 16/122 |
| 2018/0204022 | A1 * | 7/2018 | Panchbudhe | G06F 21/604 |
| 2018/0268079 | A1 * | 9/2018 | Das | G06F 16/90335 |
| 2019/0147181 | A1 * | 5/2019 | Gassner | G06F 16/2428 726/4 |
| 2019/0258811 | A1 * | 8/2019 | Ferraiolo | G06F 21/6218 |
| 2021/0133350 | A1 * | 5/2021 | Kirti | G06F 21/6245 |
| 2021/0141920 | A1 * | 5/2021 | Khurana | G06F 21/31 |
| 2021/0294797 | A1 * | 9/2021 | Gupta | G06F 16/2456 |
| 2022/0308844 | A1 * | 9/2022 | Roisman | G06F 8/427 |
| 2023/0105205 | A1 * | 4/2023 | Buchmann | G06F 16/258 707/769 |
| 2023/0122781 | A1 * | 4/2023 | Shekhar | G06F 16/90335 707/769 |
| 2023/0164189 | A1 * | 5/2023 | Danilchenko | H04L 63/10 726/1 |
| 2024/0250992 | A1 * | 7/2024 | Pathapati | H04L 63/0281 |
| 2024/0289470 | A1 * | 8/2024 | Clauson | G06F 21/604 |
| 2024/0378208 | A1 * | 11/2024 | Zhou | G06F 16/24561 |
| 2025/0225264 | A1 * | 7/2025 | Khare | G06F 21/604 |

* cited by examiner

263

264

POLICY ENFORCEMENT IN A VIRTUAL DATABASE SYSTEM

TECHNICAL FIELD

The present disclosure generally relates to managing data access through a virtual database system, including the enforcement of policies during data access.

BACKGROUND

The approaches described in this section are approaches that could be pursued but not necessarily approaches that have been previously conceived or pursued. Therefore, unless otherwise indicated, it should not be assumed that any of the approaches described in this section qualify as prior art merely by virtue of their inclusion in this section.

Organizations rely on data to inform business and managerial decisions. This data is spread across various systems and repositories, including flat files, relational databases, NoSQL databases, data warehouses, data marts, data lakes, and both cloud-based and on-premises applications and services, as well as JSON and XML files. Data volumes grow daily, as does the number of data repositories and systems used by an organization. Consequently, organizations adopt more technology as the software industry introduces new data formats, systems, and services.

Traditionally, systems enforce policies by attaching metadata directly to users and roles, with only their storage systems capable of enforcing those policies. This results in static and hard-to-manage sets of metadata that apply to a single data storage unit. While some systems attempt to provide more abstract policy systems, they usually try to synchronize with external data storage units by forwarding changes to separate systems. Additionally, numerous data storage units lack the ability to express or enforce policies that restrict data access or manipulation. In such cases, higher levels of policy enforcement simply do not exist. Even when they do exist in their simplest forms, there are limited ways to assign policy items to complex user sets defined by memberships within larger data structures, such as groups and hierarchies.

This disclosure relates to a system that allows for complex and dynamic policies to be applied across various data storage units for sets of users described using names, roles, groups, and hierarchies, where a virtual database system may act as a middleware tier that can enforce diverse policy requirements across any data store.

SUMMARY

The appended claims may serve as a summary reflecting one or more example embodiments of the present disclosure.

DETAILED DESCRIPTION

Figure 1A:
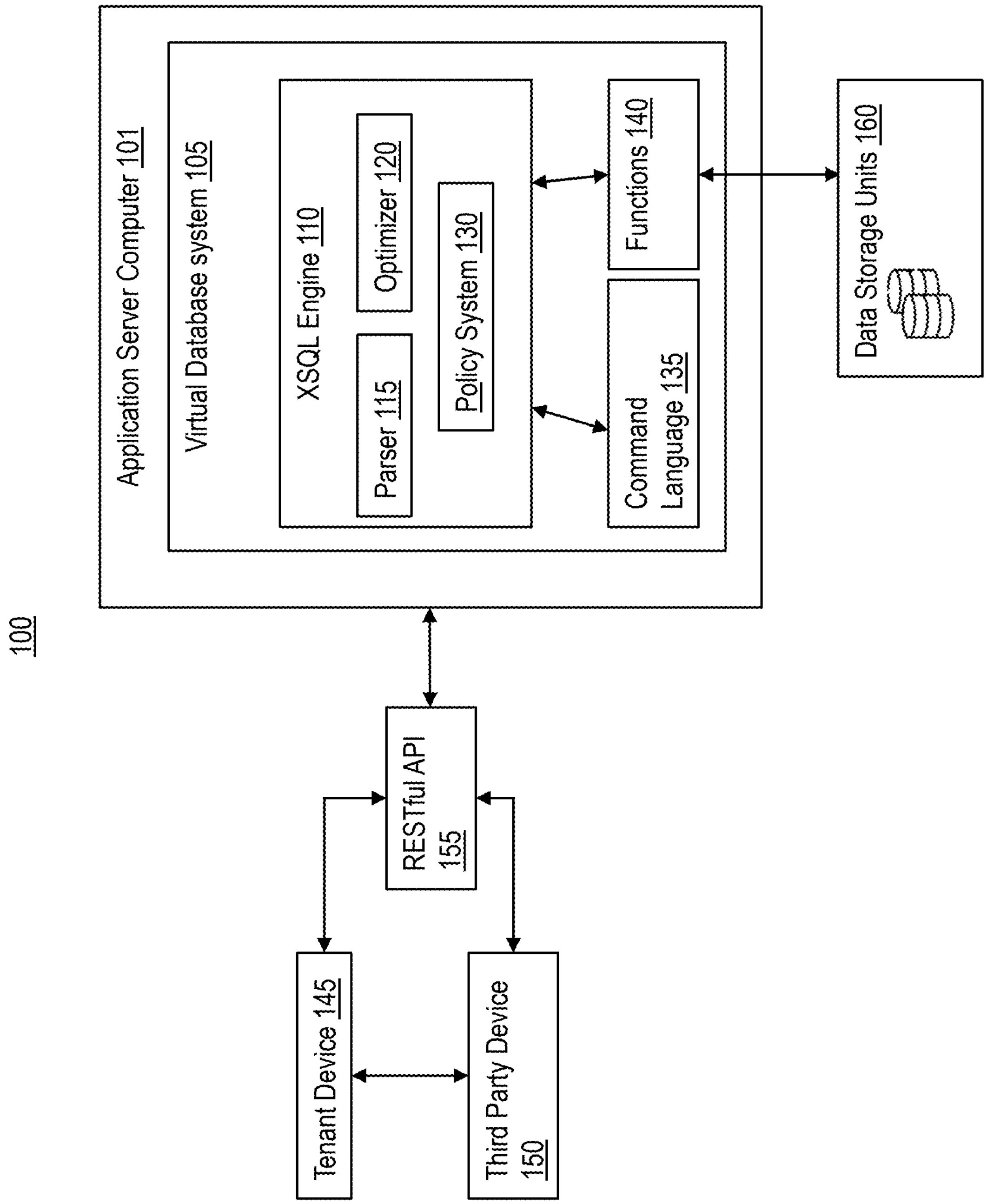
FIG. 1A shows a block diagram of a system, in accordance with various embodiments.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

The text of this disclosure, in combination with the drawing figures, is intended to state in prose the algorithms that are necessary to program the computer to implement the claimed inventions at the same level of detail that is used by people of skill in the arts to which this disclosure pertains to communicate with one another concerning functions to be programmed, inputs, transformations, outputs and other aspects of programming. That is, the level of detail set forth in this disclosure is the same level of detail that persons of skill in the art normally use to communicate with one another to express algorithms to be programmed or the structure and function of programs to implement the inventions claimed herein.

This disclosure may describe one or more different inventions, with alternative embodiments to illustrate examples. Other embodiments may be utilized, and structural, logical, software, electrical, and other changes may be made without departing from the scope of the particular inventions. Various modifications and alterations are possible and expected. Some features of one or more of the inventions may be described with reference to one or more particular embodiments or drawing figures, but such features are not limited to usage in the one or more particular embodiments or figures with reference to which they are described. Thus, the present disclosure is neither a literal description of all embodiments of one or more inventions nor a listing of features of one or more inventions that must be present in all embodiments.

Headings of sections and the title are provided for convenience but are not intended to limit the disclosure in any way or as a basis for interpreting the claims. Devices described as in communication with each other need not be in continuous communication with each other, unless expressly specified otherwise. In addition, devices that communicate with each other may communicate directly or indirectly through one or more intermediaries, logical or physical.

A description of an embodiment with several components in communication with one other does not imply that all such components are required. Optional components may be described to illustrate a variety of possible embodiments and to illustrate one or more aspects of the inventions fully. Similarly, although process steps, method steps, algorithms, or the like may be described in sequential order, such processes, methods, and algorithms may generally be configured to work in different orders unless specifically stated to the contrary. Any sequence or order of steps described in this disclosure is not a required sequence or order. The steps of the described processes may be performed in any order practical. Further, some steps may be performed simultaneously. The illustration of a process in a drawing does not exclude variations and modifications, does not imply that the process or any of its steps are necessary to one or more of the invention(s), and does not imply that the illustrated process is preferred. The steps may be described once per embodiment but need not occur only once. Some steps may be omitted in some embodiments or occurrences, or some steps may be executed more than once in a given embodiment or occurrence. When a single device or article is described, more than one device or article may be used in place of a single device or article. Where more than one device or article is described, a single device or article may be used instead of more than one device or article.

The functionality or features of a device may be alternatively embodied by one or more other devices that are not explicitly described as having such functionality or features. Thus, other embodiments of one or more inventions need not include the device itself. Techniques and mechanisms described or referenced herein will sometimes be described in singular form for clarity. However, it should be noted that particular embodiments include multiple iterations of a technique or manifestations of a mechanism unless noted otherwise. Process descriptions or blocks in figures should be understood as representing modules, segments, or portions of code, including one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved.

1. General Overview

Embodiments encompass the subject matter of the following numbered clauses:

1. A method for transacting data with a data repository via a virtual database system, the method comprising receiving a query comprising user metadata and a request for transacting data with one or more data repositories; parsing the query to create a command graph comprising one or more nodes and node-associated metadata, wherein each of the one or more nodes represents a command action for processing or transacting the data, and the node-associated metadata describes a behavior of the command action; retrieving one or more policy rules based on the user metadata; applying security policies to the one or more nodes by updating the node-associated metadata; updating the command graph based on the updating of the node-associated metadata; and executing each of the command actions corresponding to the one or more nodes of the updated command graph.

2. The method of clause 1, wherein the request for transacting data comprises one or more XSQL commands.

3. The method of clause 1, wherein the request for performing a data transaction includes at least one of a request for uploading the data to the one or more data repositories or a request for downloading the data from the data repository.

4. The method of clause 1, wherein the request for performing a data transaction includes at least one of a request to select the data for download from the data repository, insert the data into the data repository, update the data in the data repository, or delete the data in the repository.

5. The method of clause 1, wherein the node-associated metadata describes one or more permissions for performing actions associated with the transacting of the data.

6. The method of clause 1, wherein the user metadata includes one or more of roles, groups, or hierarchies for one or more users, and wherein the one or more policy rules determine permissions for performing actions when transacting the data for the one or more users grouped by the one or more of roles, groups, or hierarchies.

7. The method of clause 1, wherein the one or more policy rules include at least one of a row-level access control, a column-level access control, a predicate-based access control, a role-based access control, a group-based access control a hierarchy-based access control, or a dynamic access control.

8. The method of clause 1, further comprising performing an authentication of a user with the virtual database system, wherein the virtual database system comprises an application programming interface for accessing a plurality of different data repositories.

9. The method of clause 8, wherein the security policies are reduced to a canonical form representing a union of access allowances and prohibitions.

10. The method of clause 9, further comprising defining one or more policy conflict resolution rules based on the user metadata.

11. The method of clause 1, further comprising optimizing the updated command graph by reordering the one or more nodes, joining the one or more nodes, or modifying the one or more nodes, wherein the optimizing improves an efficiency of the command actions corresponding to the one or more nodes of the updated command graph without altering a result of the command actions.

12. The method of clause 11, wherein the optimizing further includes obtaining one or more predicate-based access control policies and modifying one or more of the command actions corresponding to the one or more nodes of the updated command graph to incorporate the one or more predicate-based access control policies.

13. The method of clause 11, wherein the optimizing includes processing the updated command graph multiple times until a specified optimization criteria are met.

14. The method of clause 1, wherein the command action for processing or transacting the data comprises one or more XSQL commands, and the method further comprising: updating the one or more XSQL commands based on a data repository associated with the request for transacting data with the one or more data repositories, by at least one of replacing a generic function with a corresponding function specific to the data repository or replacing an abstract table name with a corresponding table name of the data repository.

15. The method of clause 1, further comprising updating the one or more policy rules, wherein updating the one or more policy rules includes at least one of: creating an allowance policy rule associated with access to a particular data resource for one or more users; creating a denial policy rule associated with access to a particular data resource for one or more users; or assigning one or more policy rules to one or more users.

16. The method of clause 1, wherein the security policies comprise at least one of allowing an access to data within the one or more data repositories or denying access to data within the one or more data repositories.

17. The method of clause 1, wherein the security policies comprise predicate-based access control, the predicate-based access control is configured to allow access to data within the one or more data repositories based on a positive evaluation of a specific condition.

18. The method of clause 17, wherein the specific condition is configured to allow access to a first set of data within the one or more data repositories, the first set of data having an associated first set of parameters, while denying access to a second set of data within the one or more data repositories, the second set of data having an associated second set of parameters, wherein the first set of parameters is different from the second set of parameters.

2. Structural & Functional Overview

FIG. 1A illustrates an example computing environment 100 that includes an application server computer 101, data storage units 160, a RESTful application programming interface (API) 155, a tenant device 145, and a third-party device 150. Application server computer 101 further comprises a virtual database system 105, an XSQL engine 110, a command language 135, and functions 140 for interacting with and transacting data with data storage units 160. Additionally, XSQL engine 110 includes a parser 115, an optimizer 120, and a policy system 130.

Computing environment 100 shown in FIG. 1A is a programmed, computer-based system. The various components of the system shown in FIG. 1A are implemented at least partially by hardware at one or more computing devices, such as one or more hardware processors executing instructions stored in one or more memories for performing various functions described herein. FIG. 1A illustrates only one of many possible arrangements of components configured to perform the functions and programmatic operations that are described herein. Other arrangements may include fewer or different components, and the division of work between the components may vary depending on the arrangement.

Application server computer 101 is communicatively connected, using any wired and/or wireless connection, to tenant device 145 and/or third-party device 150 (via RESTful API 155), as well as data storage units 160. Application server computer 101 includes any software and/or hardware as needed to implement embodiments of the present disclosure. Additionally, although application server computer 101 is depicted as a single device, application server computer 101 may include any number of devices in one or more locations.

In one embodiment, the virtual database system 105 of application server computer 101 includes computers and programs that provide tenants in a multitenant system with access to their data via SQL queries, as if the data existed on a single-tenant system. Virtual database system 105 is responsible for receiving and executing all incoming commands and then making the results of that execution available to the system that submitted the command.

Virtual database system 105 includes suitable software for receiving credential information from tenants, such as a login and password. This credential information is used to link the tenant with their private data and ensure that the correct data is provided to the correct tenant. The credential information may comprise a username and password, multi-factor authentication, or other security credentials.

Virtual database system 105 offers users and administrators a SQL-based query and command language. This language supports both data manipulation (DML) and data definition language (DDL) operations. It allows administrators to define and assign policies. These policies are enforced by virtual database system 105 against external data stores and virtual database system 105 assets, such as domain objects, functions, and commands. Notably, the policies adhere to a similar syntax and structure across different diverse data repositories, including data storage units 160. This consistency reduces the need for users and developers to learn specific languages, commands, applications, and protocols for each individual data repository.

In some embodiments, virtual database system 105 includes software (e.g., parser 115) that translates incoming commands into a command graph representing the processing steps to execute the command actions.

In one embodiment, virtual database system 105 is programmed to perform logging of all actions taken by a tenant, for tracking purposes. For example, the virtual database system 105 is programmed to identify any actions (e.g., joins, add columns, etc.) taken by functions 140 and to individually commit and/or update the multitenant system and/or production data storage unit 160, on a job-by-job basis. In one embodiment, any suitable component may determine whether to commit and/or update data based on tenant actions within virtual database system 105, such as another application or module executing on application server computer 101 or another device, an administrator or other user, etc. Additionally, actions may be logged in any suitable manner.

In various cases, the virtual database system 105 is configured to take command inputs from the RESTful API 155 and convert them into a command graph.

XSQL engine 110 is a library of classes that can be composed into a graph to execute commands. These commands can either manipulate or process data. Each instance of a class in this library represents a node in the graph. These instances implement shared interfaces, allowing data to flow through the graph and ultimately deliver a result. All data access or manipulation is performed by classes that implement function interfaces and are dynamically loaded. Instances of these function classes access or manipulate data by connecting to data storage units and performing operations that align with the interfaces defined in the library.

In various cases, parser 115 of XSQL engine 110 can be a recursive descent parser that recognizes the XSQL command language. XSQL is a derivative of SQL, with extensions and enhancements to support the semantics of the XSQL engine. The input is a text representation of an XSQL command, and the output of parser 115 can be a command graph.

In one embodiment, parser 115 comprises logic or programs that are programmed or configured to parse and execute queries that are received in SQL and then transformed into a command graph corresponding to a query syntax similar to conventional SQL. In various cases, parser 115 is programmed not to directly store or modify information in any table, database, or other data storage target. Parser 115 includes suitable software to parse SQL queries from RESTful API 155 and provide interfaces for interaction with functions 140. A query may be received from RESTful API 155 in ordinary SQL or XSQL and then transformed by parser 115 to a command graph that can correspond to XSQL for subsequent processing.

Figure 1B:
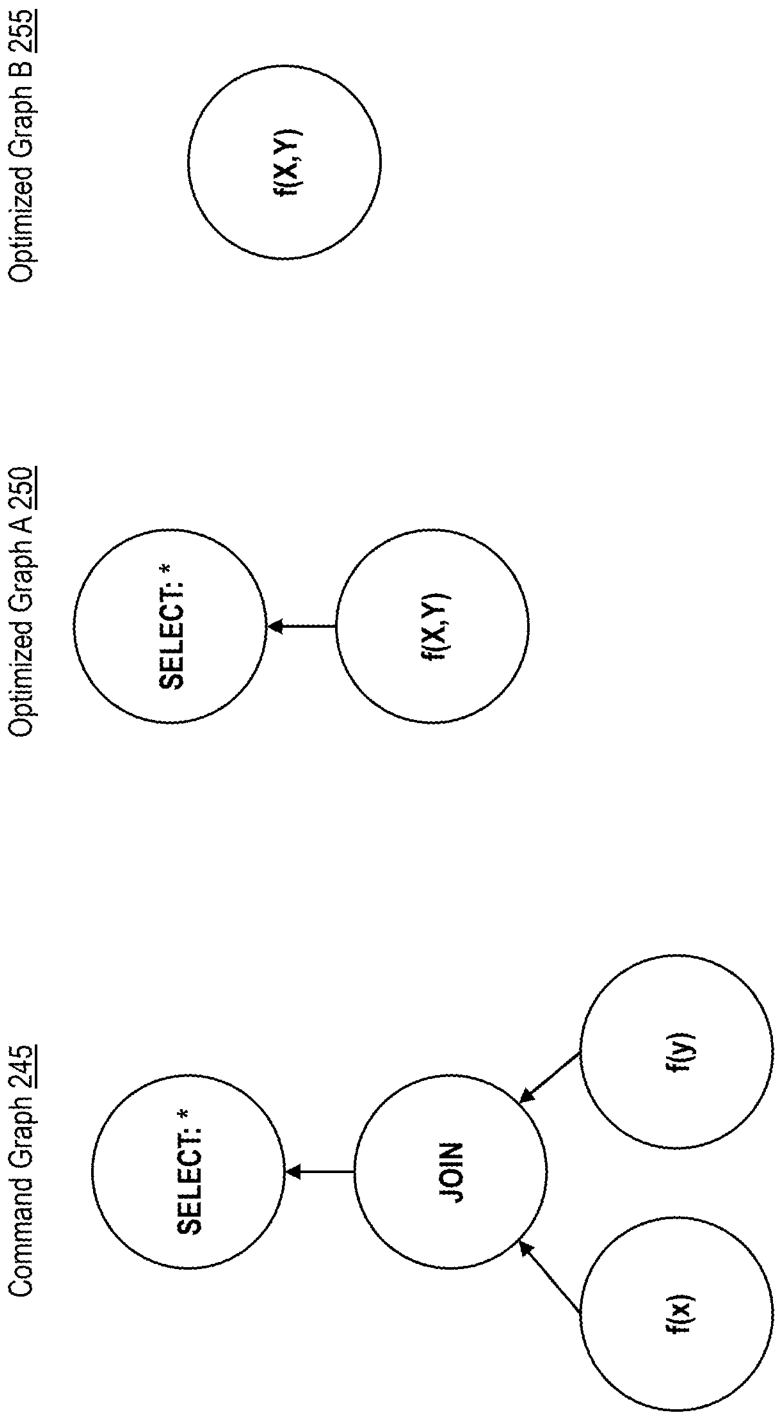
FIG. 1B shows examples of command graphs, in accordance with various embodiments.

The command graph output by parser 115 may contain multiple nodes and may be organized in any suitable fashion. Each node of the command graph generated by parser 115 may represent a Java class, a function, a data structure, or any other suitable element. FIG. 1B shows an example command graph 245 that may be generated by parser 115 for the statement: Select*from f(x) join f(y). For this example, function f returns all data in the associated table, database, or other suitable location. Thus, f(x) returns all data in "x." Functions are explained in further detail, below. As can be seen in command graph 245, after f(x) and f(y) return all data from "x" and "y," the results are joined, and all results are selected for returning to the requesting tenant and/or user. In one embodiment, the join may be performed by XSQL engine 110, or other suitable components.

In various embodiments, each command is represented by a limited set of predefined actions. These actions are then translated into a command graph, where each action is represented by a node or a unique set of nodes. The nodes contain metadata that dictates the specific behavior of the action they represent. As data flows through the graph from children to parents, each node has the opportunity to process or transform the data as it moves from its children, through itself, to its parents.

The command graph itself is an instantiated representation of the incoming command's semantics. It's composed of nodes, which are instances of programming language classes. These nodes are connected by references, with connections going from parent to child and child to parent. Each node represents an action that processes or delivers data in a specific form to its parent node, as reflected in the graph's structure.

In various cases, XSQL engine 110 and the XSQL query do not access data directly; instead, the functions substituted into the query are called, and those functions perform any required data access. As a result, a user, user program, or system program can form an SQL-style query and specify a target object, but parser 115 in combination with optimizer 120 and policy system 130, acts as an intermediary to govern whether the query is permitted to access or update the specified target object, and automatically substitutes program functions that can enforce tenant boundaries or other security requirements. Therefore, the user, user program, or system program can operate as if it has exclusive, single-tenant access to the database, yet parser 115 and other elements of the system of FIG. 1A can actually implement a multi-tenant system in a single shared database.

An added benefit of this approach is that XSQL engine 110 may not require input XSQL that specifies how functions 140 access the data. However, functions 140 and XSQL engine 110 may be programmed in a compatible manner. For example, in one embodiment, each of the functions 140 returns data in table form so that the XSQL engine 110 can pass the result set directly to the calling program. The XSQL engine 110 may have additional requirements for functions 140.

Policy system 130 is configured to modify the command graph generated by parser 115. This modification involves first allowing class instances, which are nodes in the command graph, to replace parts of the graph with a different instance of the same class, and second, traversing the graph and injecting new policy-enforcing nodes. Policy system 130 identifies policies for a group of users within a namespace of policy sets, each containing a set of policy items. These policy items describe the operations that are either revoked or granted to a user, role, group, or hierarchy node. The optimizer then enforces these policies by dynamically placing policy nodes into the command graph.

Policy system 130 defines a set of metadata representing policies to be applied to any command graph. This system includes metadata that describes the naming, assignment, and grouping of policy items. A policy item outlines actions, assets, and sets of expressions. Policy system 130 takes the command graph as input and modifies it based on currently defined policies. It dynamically identifies the applicable policies and determines which policy applies to the specific user associated with the command graph, then performs the appropriate modifications and method calls.

A policy item can contain a dynamic function call that takes two parameters as a final step in the policy process: the command graph and the user set. This function modifies the command graph and returns a new, updated command graph, ensuring that policies can rewrite the command graph without removing any previously applied policies. This allows any dynamic policy to be applied to any command graph across any user set.

Roles, groups, and hierarchies are data structures and namespaces that can statically and dynamically identify a set of users within a structural context. Individual users can be associated with roles, groups, and hierarchies. These groups and hierarchies can also contain commands that dynamically fetch a set of users. The union of statically and dynamically defined users is then used to apply policies to the command graph for the specific user at the moment the command is submitted to virtual database system 105.

Policy system 130 allows for dynamic policies to be applied to a dynamically defined set of users. Various functions 140 are used to define the policy metadata. The metadata may leverage the power of dynamically invoking functions within the context of commands that return rowsets. The system's extensibility through the implementation of new functions ensures that the combinations and reach of policies across any set of users are not limited by any static implementation of data storage or any combination of actions across data that can be accessed or manipulated through these functions.

In various cases, optimizer 120 can optimize the command graph, as further described in detail below, ensuring that each remaining function, which is a class instance in the command graph, efficiently performs any original action expressed in the incoming command while also enforcing all applicable policies for the correct set of users.

Returning to FIG. 1A, in one embodiment, the command graph generated by parser 115 is predictable, based on the commands contained in the query used to generate the graph, and is not optimized. In other words, the output of parser 115 may be improved to result in a shorter, more efficient graph that reduces the amount of time and effort that may be required to generate a response to the query associated with the graph.

To optimize, the command graph optimizer 120 is used. Optimizer 120 takes as input the graph generated by parser 115, and generates a second, updated optimized graph. In some instances, optimizer 120 may be unable to improve upon the output of parser 115, and no changes or improvements will be made to the command graph generated by parser 115. However, optimizer 120 is frequently able to improve on the command graph generated by parser 115. Optimizer 120 may process the graph generated by parser 115 in a variety of ways. Specifically, optimizer 120 may iterate through a graph using a visitor path, treat each node as though the node(s) contained data, and check if there are improvements that can be made. Any improvements made may, for example, reduce the size of the graph, improve the efficiency of the graph, or improve any other aspect of the graph (and thus the execution of the query). Optionally, optimizer 120 may take as input an optimized graph to check if there are further possible optimizations.

In one embodiment, optimizer 120 may instruct the nodes of the graph to optimize themselves. This self-optimization may be based on whether or not a given class and/or function implements a given interface (e.g., a function that performs a select may also implement a join, etc.), and/or whether the given class and/or function is able to perform additional steps or functionality. Further, when instructing a node to optimize, the optimization may be for a specific instruction or instructions. For example, optimizer 120 may instruct a node or nodes to optimize for select, predicate, join, aggregate, and/or sort. Alternatively, other optimizations may be performed. When optimizer 120 asks a node to optimize itself, if the node is able to optimize, the node returns another node or nodes. Specifically, the node may return a new instance of itself with additional data, a new class, a new node, a new function, etc. If a node (or nodes) is unable to optimize, then no new node is returned, and the process proceeds to another node or may end as the command graph may be optimized. When a node is asked to optimize itself, the node may optionally optimize any child nodes, if applicable. In one embodiment, the top node of the graph may be asked to optimize itself. Optionally, the top node may then request that a child node optimize itself until a node is reached where an optimization may be performed. Alternatively, the optimization may be performed in any other suitable manner.

Returning to FIG. 1A, in some embodiments, the way in which optimizer 120 performs optimization enables the decision point for which optimizations to perform to be moved from XSQL engine 110 to the functions 140. In other words, instead of XSQL engine 110 having to know how to optimize graphs for many different instructions and resources, the functions used to perform the instructions and/or access the resources determine whether the optimization is to be performed. The moving of this decision point results in a much simpler optimizer 120 than would be expected, and also results in pushing as much processing as possible to the functions, and thus away from the device or devices that execute XSQL engine 110.

In some embodiments, command language 135 of virtual database system 105 can be a text-based command language processor that can be configured to transform SQL queries, such as those used by XSQL engine 110, into XSQL queries that include references to or invocations of functions 140. In one embodiment, command language 135 dynamically places calls to functions 140 into in-memory representations of received SQL queries, after the SQL queries have been parsed and transformed into tokens or other data representations in memory.

In one embodiment additional functions may be created by any entity, including but not limited to the tenants and application service provider. In other words, there is no requirement that the functions 140 are defined only by functions of application server computer 101. In one embodiment, one or more functions 140 may be created by the entity that owns or operates application server computer 101. Alternatively, or in addition, one or more functions 140 may be created by one or more customers, such as a user of tenant device 145. Functions 140 may be defined using a source code programming environment using a language such as JAVA, C, C++, etc. Specifically, functions 140 are programmed to access one or more data sources.

In some embodiments, functions 140 may perform any type of action related to data including, but not limited to: joining, selection, filtering, aggregating, post-aggregation filtering, distinction, limits, and/or any combination of these actions. In some embodiments, functions 140 are programmed to write, or otherwise modify, data as requested by a tenant only in a non-production database, and the tenant or calling program may be uninformed about where the data is actually stored and/or written. This approach permits causing any changes to be reviewed or approved before updating the production database; in various embodiments, updates may be copied to an approval workflow for manual review by analysts under the control of a workflow processing engine or processed using review rules or approval rules under program control such as using regular expressions.

In some cases, functions 140, which can be referenced within any expression or command, can provide the means to deliver a row-set. Given the generic nature of this concept, functions 140 can be defined and utilized at any point in a command where a row-set is described or referenced. Thus, functions 140 can be composed to traverse roles, groups, or hierarchies to determine the set of users to which particular policies apply.

In one embodiment, functions 140 may include software for reading only without write capability. Functions 140 may include inheritance, may reference additional classes, have helper functions, and/or have any other aspect or feature typical of functions. There may be any number of functions 140 and the architecture of FIG. 1A allows implementing dozens to thousands of functions subject only to storage or CPU constraints. Functions 140 may execute without the broader system, such as XSQL engine 110, being aware of how the execution is being performed. Rather, functions 140 need only return data in an array, or other useable form, and no additional information is needed or expected by the broader system.

In one embodiment, functions 140 are designed to integrate different data storage units 160. A single function can connect to multiple different data storage units 160. Additionally, there can be multiple functions that connect to the same data storage in various ways while operating within the application server computer 101. When a data storage accessed by one of the functions 140 is capable of performing actions independently, such as a database that can support data selection on its own, the functions may allow the data store to handle the task. This approach can significantly reduce the processing load on the application server computer 101 or other devices.

This capability is particularly beneficial during the optimization process by optimizer 120. For instance, tasks that would typically be performed by the XSQL engine 110, such as joining data from different sources (e.g., performing a join operation on tables X and Y), can instead be handled by functions and their federated data stores (e.g., selecting data from tables X and Y directly from the data stores).

In another embodiment, a function implementation can utilize any or all of the available federation interfaces. A federation interface is a standard method that allows different data storage systems to communicate and work together as if they were a single system. This allows a function to replace one or more parts of the query graph with a single function call, depending on the function's implementation. The optimizer is responsible for managing this replacement process, ensuring that portions of the query graph are replaced by new graph nodes provided by the function nodes at any point before or during the optimization process.

In some embodiments, data storage units 160 can be any electronic digital data recording devices that is configured to store data according to a set of rules and in any format, such as a flat file, a data store, a database, a data mart, a data warehouse or other storage units. In particular, data storage units 160 stores multi-tenant data of customers of an application service provider who owns and operates the system shown in FIG. 1A. Data storage units 160 can be any systems where data is stored, can be accessed, and potentially manipulated in place. Examples include RDBMS, NoSQL, files, XML, JSON, RESTful services, SOAP APIs, CORBA systems, databases, and other similar systems. Data storage units 160 can be any suitable diverse and distributed data repositories where data is stored across multiple physical locations, which may include different servers, data centers, or even geographical regions. The distributed nature of these data repositories lies in their ability to manage, store, and access data across these multiple locations in a coordinated manner.

In some embodiments, RESTful API 155 is an API that uses Representational State Transfer (REST) standards. Specifically, Implementing the system of FIG. 1A using a database connector with REST offers improved performance for a multitenant system. Standard implementations of database connectors rely on Transmission Control Protocol (TCP) connections, which enable Atomicity, Consistency, Isolation, and Durability (ACID). ACID is deemed to be a critical aspect of database transactions as ACID ensures that the database transactions are processed reliably. In contrast, RESTful API 155 instead elects to use REST standards at the expense of some aspects of ACID. Specifically, RESTful API 155 uses Hypertext Transfer Protocol (HTTP) to connect with a database(s). HTTP and REST enable a load balancer (not shown) to optionally be used in conjunction with RESTful API 155. In one embodiment, full ACID compliance may be achieved even when using RESTful API 155.

In one embodiment, RESTful API 155 may be made RESTful in any suitable manner. Further, RESTful API 155 may be implemented using any type of database connector, such as Java Database Connectivity (JDBC), Open Database Connectivity (ODBC), and/or any other suitable database connector. Although shown as a separate entity in FIG. 1, RESTful API 155 may be located on any suitable device, such as application server computer 101, tenant device 145, third party device 150, or may be located on a separate device, as depicted in FIG. 1A.

In some embodiments, tenant device 145 is one or more computing devices, including, but not limited to: work stations, personal computers, general purpose computers, laptops, Internet appliances, hand-held devices, wireless devices, wired devices, portable or mobile devices, wearable computers, cellular or mobile phones, portable digital assistants (PDAs), smart phones, tablets, multi-processor systems, microprocessor-based or programmable consumer electronics, game consoles, set-top boxes, network PCs, mini-computers, and the like. Tenant device 145 is communicatively connected to RESTful API 155 and third party device 150 using any suitable wired and or wireless technology. Tenant device 145 may include applications, software, and/or other executable instructions to facilitate various aspects of the embodiments described herein. Specifically, tenant device 145 is able to perform actions on data stored within the system of FIG. 1A using, for example, a web browser or other software application. Although only a single tenant device 145 is depicted, there may be any number of tenant devices 145, relating to any number of different tenants.

In some embodiments, third party device 150 is one or more computing devices, including, but not limited to: work stations, personal computers, general purpose computers, laptops, Internet appliances, hand-held devices, wireless devices, wired devices, portable or mobile devices, wearable computers, cellular or mobile phones, portable digital assistants (PDAs), smart phones, tablets, multi-processor systems, microprocessor-based or programmable consumer electronics, game consoles, set-top boxes, network PCs, mini-computers, and the like. Third party device 150 may include applications, software, and/or other executable instructions to facilitate various aspects of embodiments. Specifically, third party device 150 is able to communicate with application server computer 101 using, for example, a web browser or other application, and perform actions on data stored within the system of FIG. 1A. In some embodiments, third party device 150 is used by a third party to perform ETL on the data of a tenant before the data is uploaded into the multitenant database.

FIG. 1A illustrates only one of many possible arrangements of components configured to execute the programming approaches described herein. Other arrangements may include fewer or different components, and the division of work between the components may vary depending on the arrangement.

FIG. 1A, and the other drawing figures and all of the description and claims in this disclosure, are intended to present, disclose and claim a technical system and technical methods in which specially programmed computers, using a special-purpose distributed computer system design, execute functions that have not been available before to provide a practical application of computing technology to the problem of policy enforcement in a virtual database system. In this manner, the disclosure presents a technical solution to a technical problem, and any interpretation of the disclosure or claims to cover any judicial exception to patent eligibility, such as an abstract idea, mental process, method of organizing human activity, or mathematical algorithm, has no support in this disclosure and is erroneous.

FIG. 1B illustrates an example optimization of a command graph 245. Command graph 245 represents the output from parser 115. It is an instantiation of classes connected through object references, forming an acyclic structure connected only from parent to child and child to parent. Each instance in this graph is called a node, and each node implements a specific set of interfaces defined in the XSQL library, with the option to implement various interfaces indicating supported data access, processing, and optimizations.

Optimized graph A 250 shows command graph 245 after optimization, allowing nodes to perform additional operations and consume certain sub-sections of the graph through interface method calls.

In various cases, optimized graph A 250 results from an optimization step where functions replace join operations with a new instance of the function class capable of performing the join within the function code itself. If the function cannot perform data joins, the graph remains unchanged from the original command graph.

Optimized graph A 250 demonstrates a function "f" executing the join operation by overriding and implementing specific interface methods and returning particular results. Optimized graph B 255 results from function "f" also consuming the selection operation by overriding and implementing the associated interface methods.

Command graph 245 may be generated by a parser for the statement: SELECT*FROM f(x) JOIN f(y). In this example, function "f" returns all data from the associated table, database, or any other storage format. The instance of class "f" with parameters (x) returns all data in "x," while the instance with parameters (y) returns all data in "y." In command graph 245, after "f(x)" and "f(y)" return all data from "x" and "y," the results are joined, and all results are selected for return to the requesting tenant and/or user. The join may be performed by virtual database system 105 or federated to the data storage unit associated with function "f."

Optimized graph A 250 is achieved by optimizing command graph 245 for selection. Both children of the join node are function "f," so function "f" is asked if it can return the data from "x" joined with the data from "y," effectively replacing the join node and federating the join to the data storage unit associated with "f." In this example, function "f" can perform this functionality, and thus the returned node is "f(x,y)," which replaces the join node, resulting in optimized graph A 250. Instead of receiving data from "f(x)" followed by "f(y)" and then performing the standard join of XSQL, function "f" retrieves the joined data directly from the data storage unit, eliminating the need for a join node.

Further optimizations are possible, as shown in optimized graph B 255. Since function "f(x,y)" returns all data columns from "x" joined with "y," the*node becomes unnecessary. A new node is returned, and the object graph simplifies to a single node: "f(x,y)." Optimized graph B 255 is now fully optimized, with all extraneous nodes removed.

Figure 1C:
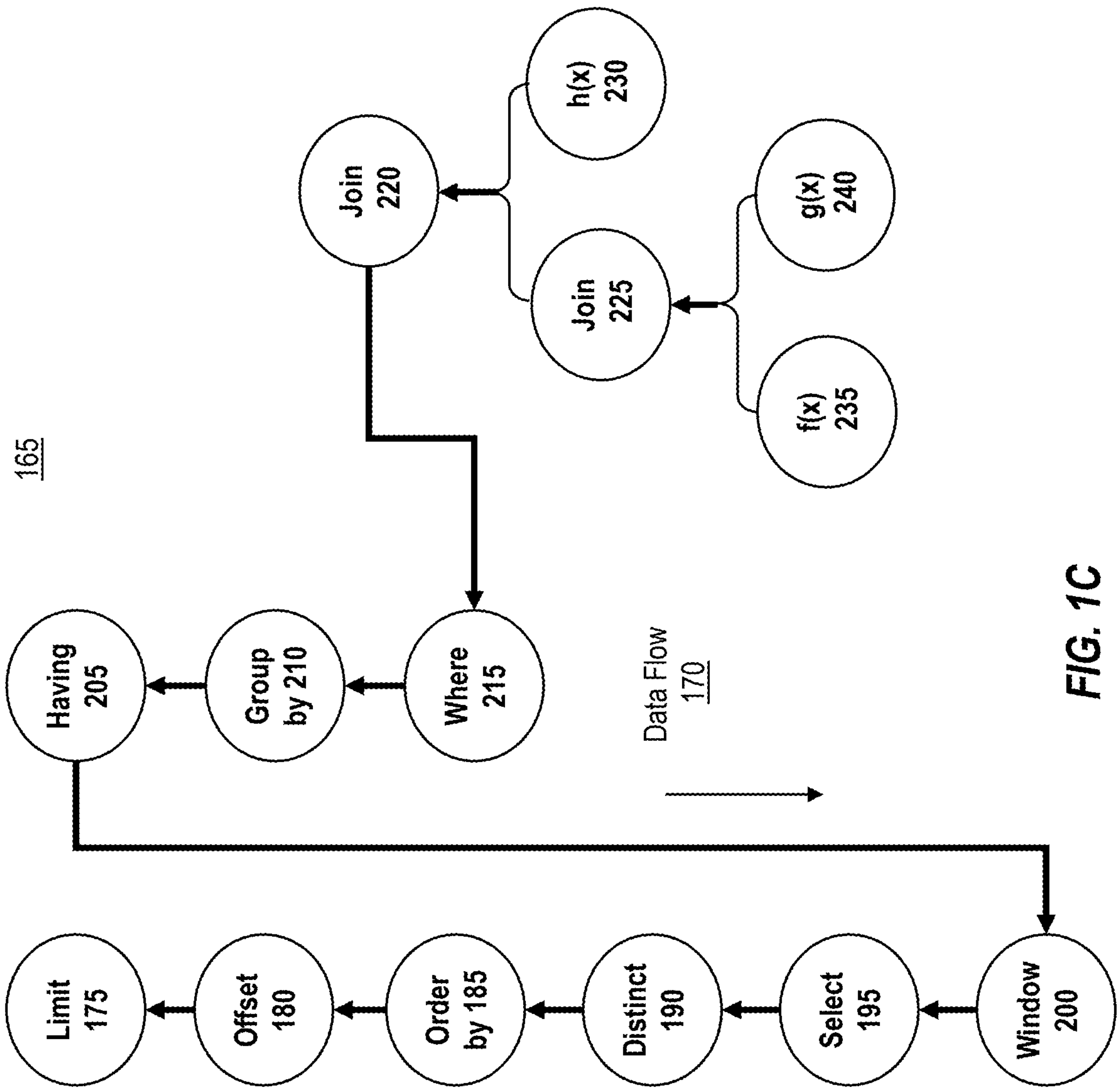
FIG. 1C is an example of a command graph, in accordance with various embodiments.

FIG. 1C is a representation of the maximum canonical command graph 165 that can be generated by a SELECT statement sent to virtual database system 105. Graph 165 has a canonical form, representing the clauses or sections of the input command and the necessary metadata to execute the command correctly.

In various cases, parser 115 is configured to generate graph 165 from the input command text. Further, optimizer 120 may then traverse graph 165 multiple times, calling methods on each node that allow it to rewrite itself and its subtree, consume a larger portion of graph 165, or optimize its operation while maintaining the exact semantic meaning of graph 165.

Because policies can be injected anywhere in graph 165, all aspects of a command can be controlled through a declared policy for any dynamically determined combination of users. For example, a user, role, group, or hierarchy member may be limited in the number of rows visible through a particular query pattern. This would be enforced by injecting a limit node with appropriate values or by modifying the limit node as determined by the applicable policy for the relevant users.

Each node type in graph 165 can be dynamically injected or modified by the policy engine of policy system 130, whether it exists in the original command or not. Each node represents a clause, section, or processing action of an input command or function. The set of users that policies apply to are dynamically determined by a set of rules, and policy actions are related to these clauses, sections, or actions. This flexibility allows the policy system to influence all aspects of a command or function.

It should be noted that command graphs are not limited to graphs with a SELECT statement. Every command can have a corresponding command graph, even if the graph consists of a single node. Policies apply to identifiable assets, allowing any command to be controlled through policies, as a command is an asset type with the command name identifying the particular command.

Command graph 165 is an example of a command graph based on a SQL SELECT statement, including the maximum number of nodes for any given SELECT query, excluding sub-queries. Sub-queries can be viewed as additional nodes embedded either in expressions attached to an existing node or as additional nodes representing a subset of graph 165.

As seen in graph 165, data flow 170 represents the direction of data flow through the graph, with data in the form of rows of values traveling from the bottom of graph 165 through parent nodes. Each node can perform transformations on the incoming data and then send different data onward, as defined by its metadata. This can be seen as a representation of a graph consisting of decorated class instances, delegation, and inheritance.

A limit class 175, as shown in graph 165, restricts the number of rows delivered as output to an integer value. An offset class 180 positions the first output row to the nth row in the input row-set, as expressed by an integer. An order by class 185 arranges the input set by a set of values according to its member data. A distinct class 190 outputs only unique rows from the input row-set as described by its member data. A select class 195 outputs row-set values determined from the input row-set, as defined by its member data. A window class 200 performs windowing operations on the input row-set and outputs data described by its member data. Further, a having class 205 outputs only rows from the input row-set that pass the defined filter expression as specified by its member data. A group by class 210 performs grouping and aggregation of the input row-set. The shape and content of the output row-set are defined by its member data. A where class 215 outputs only rows from the input row-set that pass the defined filter expression as specified by its member data. A join class 220 performs a standard join operation between the two input row-sets, as defined by its member data. A join subtree 225 represents any number of join nodes where the left child of the join node is another join node. Further, an h (x) class 230 represents a function whose code implements an interface to retrieve data from an external data storage system, as determined by its member data. An f(x) class 235 represents a function whose code implements an interface to retrieve data from an external data storage system, as determined by its member data. Also, g (x) class 240 represents a function whose code implements an interface to retrieve data from an external data storage system, as determined by its member data.

Figure 1D:
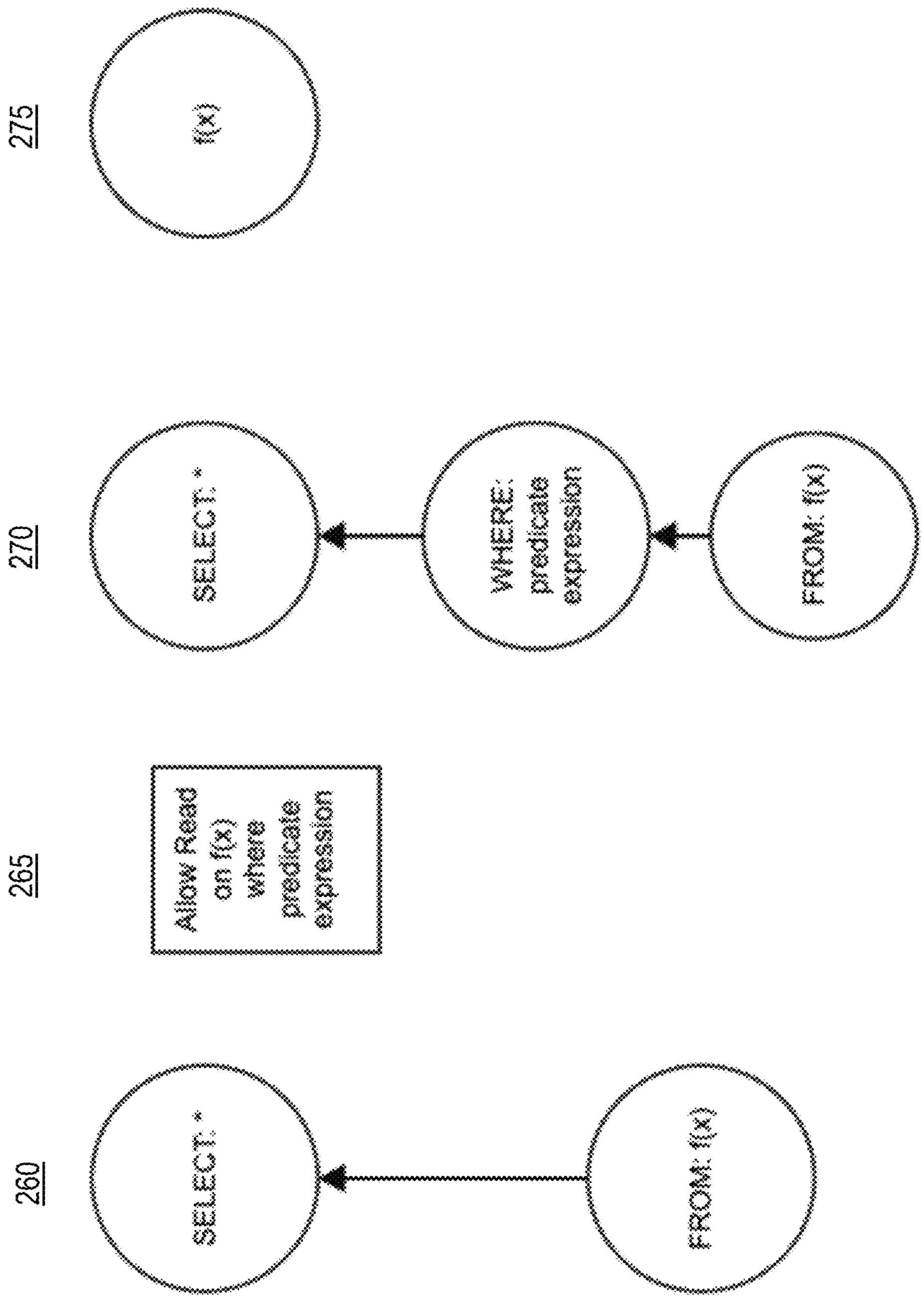
FIG. 1D is an example of command graph transformation occurring when a policy defines a predicate applied each time an associated function is instantiated within the graph, in accordance with various embodiments.

FIG. 1D illustrates an example command graph transformation when a policy associated with a function defines a predicate applied each time the function is instantiated within the command graph.

The command graph 260 is created from an XSQL query issued by a user. The query, "select*from f(x)," triggers the command graph creation. The user has an applicable policy 265 that allows read access to the function f(x). This policy includes additional predicate expressions, which, as an illustrative example, restricts access to a subset of rows returned by f(x). Virtual database system 105 is configured to apply the security policy in optimized graph 270, modifying the command graph to include the additional predicate expression by injecting a "where" node into the optimized graph.

Virtual database system 105 can further optimize the query, as shown in optimized graph 275. Since the function f(x) returns all data from "x" and can perform data filtering, the "*" in optimized graph 270 and the policy predicate expression becomes unnecessary. Thus, the command graph is simplified to a single node: f(x). Thus, command graph 275 is fully optimized, with all extraneous steps removed.

Figure 1F:
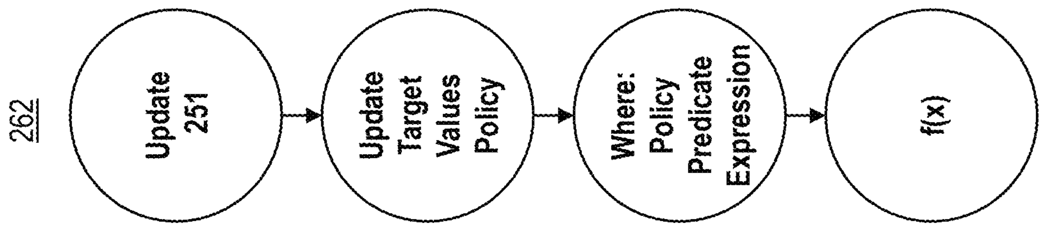
FIG. 1F is an example graph illustrating an update statement, in accordance with various embodiments.
Figure 1E:
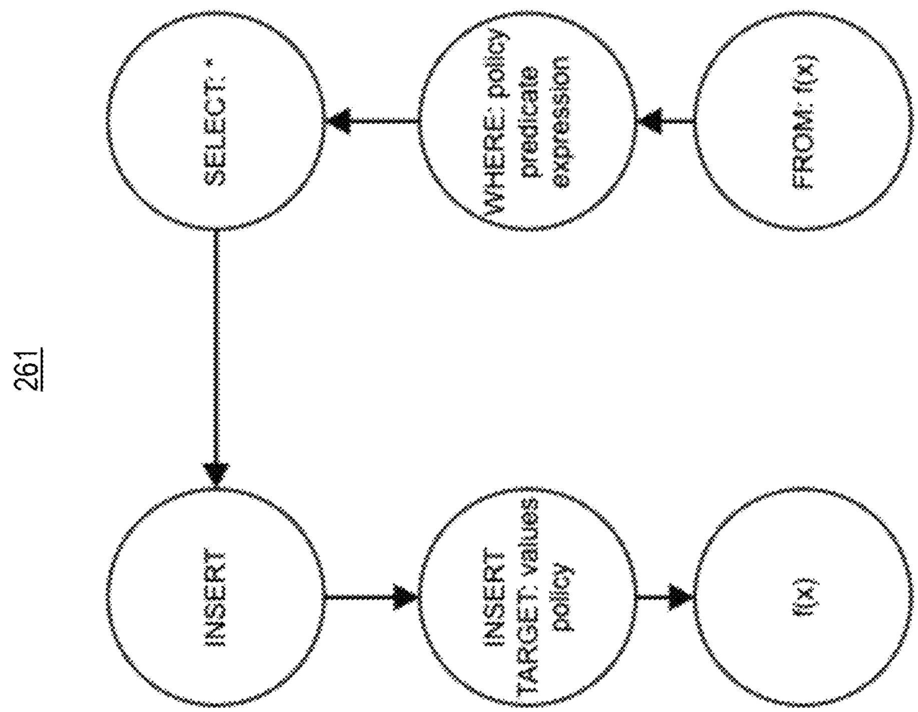
FIG. 1E is an example graph illustrating an insert statement, in accordance with various embodiments.

FIG. 1E shows an example graph 261 illustrating an insert statement. Graph 261 illustrates an example of an INSERT statement governed by a policy that not only restricts input data through a predicate but also controls the insert values into the target table using a set of default values associated with the policy item. The process begins with a selection operation that retrieves all columns (SELECT:*). Next, a policy-defined predicate expression filters the rows being selected (WHERE: policy predicate expression). The source of the data is specified by the function f(x) (FROM: f(x)). The filtered data is then prepared for insertion into the target table, with the insert values controlled by the policy. This means that, in addition to filtering the input data, the policy also specifies default values for certain columns in the target table. These default values are applied during the insertion process to ensure that the data being inserted adheres to the policy requirements (INSERT TARGET: values policy). Finally, the data is inserted into the target table, ensuring both the predicate restrictions and default values dictated by the policy are applied (INSERT).

FIG. 1F illustrates an example of a graph 262 illustrating an update statement governed by a policy that restricts both the data which can be updated and the default values that should be applied during the update. Graph 262 starts with the update operation (Update 251). The target data to be updated is identified and the policy specifies the default values to be applied during the update (Update Target Values Policy). The policy-defined predicate expression then filters the data to determine which rows are eligible for the update (Where: Policy Predicate Expression). This filtered data then updates the specified data (f(x)).

Figure 1G:
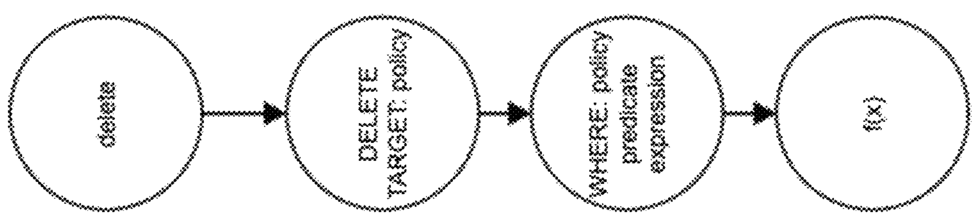
FIG. 1G is an example graph illustrating a delete statement, in accordance with various embodiments.

FIG. 1G shows an example graph 263 illustrating a delete statement governed by a policy that restricts what data can be deleted from a particular data storage unit as defined by a virtual database system such as virtual database system 105 and associated function. Graph 263 begins with the delete operation (delete). The policy specifies the target data that can be deleted (DELETE TARGET: policy). A policy-defined predicate expression is then applied to filter the data and determine which rows are eligible for deletion (WHERE: policy predicate expression). This filtered data then updates the specified data (f(x)).

Figure 1H:
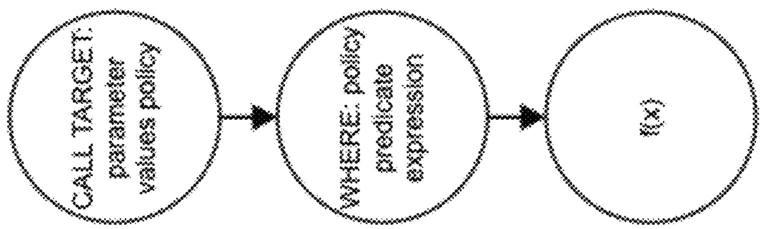
FIG. 1H is an example of a graph where the function has been called directly through a CALL command, in accordance with various embodiments.

FIG. 1H shows an example graph 264 where the function has been called directly through a CALL command yet has a policy predicate which can be applied. Graph 264 begins with the function call operation (CALL TARGET: parameter values policy). The policy specifies parameter values that must be applied during the function call. Next, a policy-defined predicate expression is applied to filter the data, determining which rows are eligible based on the policy (WHERE: policy predicate expression). This filtered data then updates the specified data (f(x)).

Figure 1I:
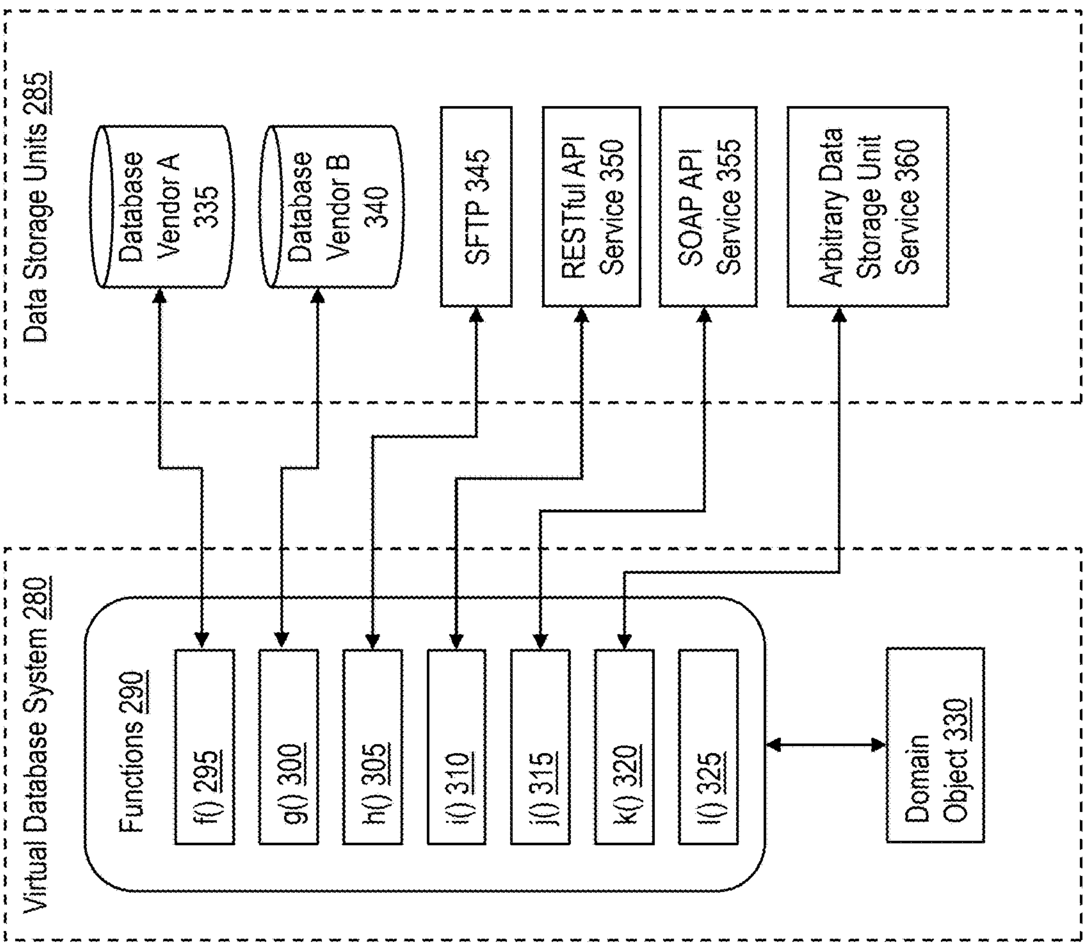
FIG. 1I is a block diagram of a virtual database system interacting with various types of data repositories, in accordance with various embodiments.

FIG. 1I shows virtual database system 280 being responsible for receiving and executing all incoming commands and then making the results of that execution available to the system that submitted the command. In various embodiments, virtual database system 280 may be similar or the same in structure or in function as virtual database system 105. FIG. 1I shows that virtual database system 280 is connected (e.g., via a suitable network) to data storage units 285. Such data storage units 285 can be any suitable systems where data is stored, accessed, and possibly manipulated in place. Examples of such units include, but are not limited to, RDBMS, NoSQL, files, XML, JSON, RESTful services, SOAP APIs, CORBA systems, and databases.

Functions 290, as shown in FIG. 1I are programming language classes that implement one or more standard sets of interfaces defined by the XSQL Engine library. Each interface defines a set of operations that describe the access or manipulation of data. The function proxies those operations to the data storage unit for each set of operations implemented by the function. If a class implements one of the standard interfaces, the interface contract is assumed to be consistent with the data storage unit the function accesses. A function implementation may choose to throw exceptions from individual interface methods or choose not to implement interfaces at all. The following functions, as listed in FIG. 1I are summarized below:

f( ) 295 is a function that implements one or more standard interfaces and accesses the database software supplied by vendor A according to the interfaces implemented.

g( ) 300 is a function that implements one or more standard interfaces and accesses the database software supplied by vendor B according to the interfaces implemented.

h( ) 305 is a function that implements one or more standard interfaces and accesses files on any external SFTP system.

i( ) 310 is a function that implements one or more standard interfaces and accesses data through a RESTful API. The specific function implementation may only access specific APIs or have a more general implementation for all RESTful APIs.

j( ) 315 is a function that implements one or more standard interfaces and accesses data through a SOAP API. The specific function implementation may only access specific APIs or have a more general implementation for all SOAP APIs.

k( ) 320 is a function that implements one or more standard interfaces and accesses data from any specific data storage unit. The function implementation specifically allows access to any data storage unit that permits programmatic access.

l( ) 325 is a function that implements one or more standard interfaces and accesses domain objects which can be defined in virtual database system 280 itself or any other application implemented using virtual database system 280.

Further, FIG. 1I shows a domain object 330. Domain object 330 may be a set of data that can be materialized into a standard programming object. This object defines methods and data associated with either virtual database system 280 or any application incorporating virtual database system 280.

In various cases, virtual database system 280 is configured to interact with data storage units 285, which may include:

Database Vendor A 335, any RDBMS system vendor usually supporting SQL as the command language; Database Vendor B 340, another RDBMS system vendor usually supporting SQL as the command language; SFTP 345, any system that supports the SFTP protocol; and RESTful API Service 350, any system that supports the standard understanding of a RESTful API, including specific implementations with distinct characteristics. Additionally, data storage units 285 may include SOAP API Service 355, any system that supports the standard understanding of a SOAP API, including specific implementations with distinct characteristics. Furthermore, data storage units 285 may include an arbitrary data storage unit 360, which may be any system where data is stored, accessed, and possibly manipulated in place. Examples include, but are not limited to, RDBMS, NoSQL, files, XML, JSON, RESTful services, SOAP APIs, CORBA systems, and databases.

Figure 2A:
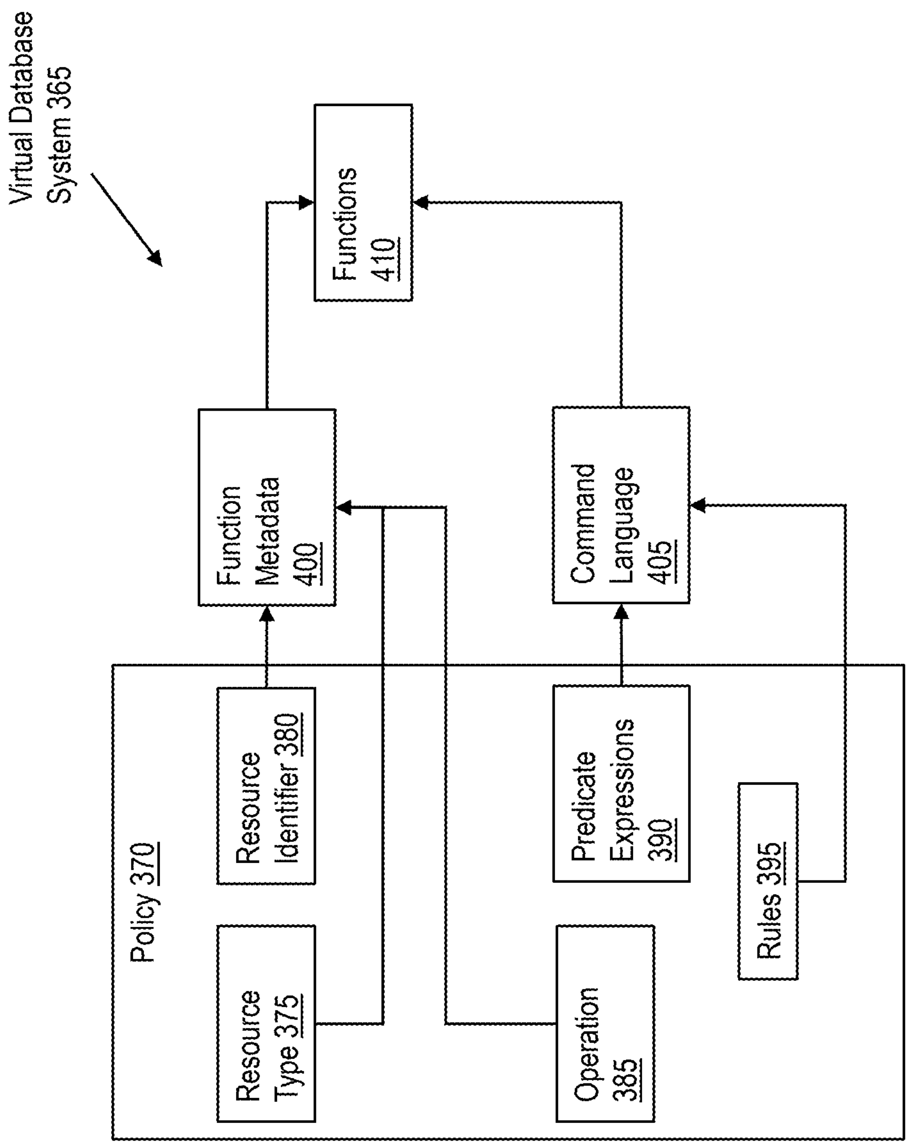
FIGS. 2A and 2B are diagrams illustrating the application of policies, in accordance with various embodiments.
Figure 2B:
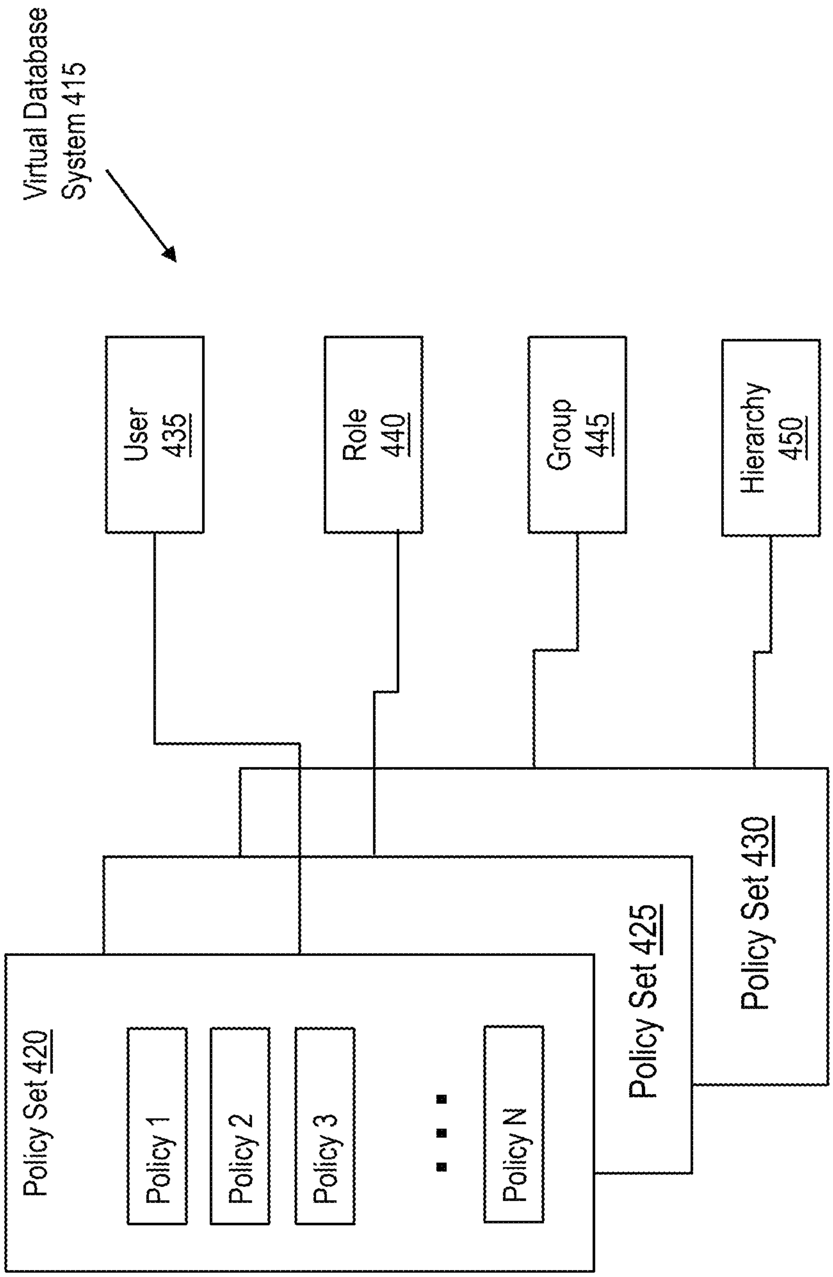

FIGS. 2A and 2B show how policies can be implemented within illustrative respective virtual database systems 365 and 415. FIG. 2A shows virtual database system 365. Virtual database system 365 is configured to receive and execute all incoming commands and then make the results of that execution available to the system that submitted the command. Policy 370 includes a namespace of policy sets, each containing a set of policy items. Policy items describe a set of operations that are either revoked or granted to a user, role, group, or hierarchy node. These policies are enforced by the optimizer, which dynamically places policy nodes into the command graph.

Resource Type 375 identifies which type of virtual database system domain object a security policy applies to. Examples of virtual database system domain objects include tables, schemas, catalogs, functions, schedules, workflows, views, schemas, catalogs, cursors, credentials, data sources, emails, files, commands, and variables.

Resource Identifier 380 is the unique identifier for a given resource type. Examples include table names, function names, domain object names, or other identifiers.

Operation 385 determines which actions on a given resource a policy will allow or deny. Examples of operations include DDL (Data Definition Language) operations such as ALTER, CREATE, and DROP, and DML (Data Manipulation Language) operations such as SELECT, READ, WRITE, INSERT, UPDATE, and DELETE. The operation EXECUTE is an option for specific resource types, such as functions and commands.

Predicate Expression 390 can be applied to resource types that return result sets, such as functions and tables. Predicate expressions are commonly found in the WHERE clause of XSQL statements. Expression comparison operators such as =, <, >, <=, !=, IN, NOT IN, BETWEEN, IS NULL, and IS NOT NULL can filter data values and perform Boolean logic. Compound expressions may be formed using the logical AND and OR operators.

Rules 395 are expressions that can dynamically set properties on policies.

Function Metadata 400 involves configuration or other properties set by the VDS or users to direct a function's behavior. An example is a JDBC connection string and database user credential required to access a relational database data storage unit.

Command Language 405 refers to a set of extensions to the XSQL Language.

Functions 410 are programming language classes that implement one or more standard sets of interfaces defined by the XSQL Engine library. Each interface defines a set of operations that describe the access or manipulation of data. The function then proxies those operations to the data storage unit for each set of operations implemented by the function. If a class implements one of the standard interfaces, the interface contract is assumed to be consistent with the data storage unit the function accesses. A function implementation may choose to throw exceptions from individual interface methods or choose not to implement interfaces at all.

FIG. 2B shows another illustrative virtual database system 415. virtual database system 415 may include multiple policy sets such as first policy set 420, second policy set 425, and so on up to Nth policy set 430.

A policy set such as one of policy sets 420-430 may contain a zero-to-many array of policy items. Any number of policy sets can exist in virtual database system 415. Privileged users can create new policy sets and alter or drop existing policy sets. In some cases, administrators or other privileged users in a tenant will create policies and policy sets. In other cases, staff or systems integrators may define policies and policy sets. As shown in FIG. 2B, policies can be applied to a user 435, role 440, group 445, or hierarchy 450. User 435 is any person or program who has been authenticated by the system. Role 440 represents categories of positions, types of jobs, or titles within virtual database system 415. Examples include business administrator, information technology administrator, sales representative, human resources administrative assistant, store manager, vice president, senior director, etc. A user may be assigned to zero-to-many roles.

Further, group 445 represents a logical organization of entities in virtual database system 415. Groups can be configurable and not fixed and can be defined to meet an organization's data classification requirements. A common example of a group is based on geographical territories. For example, the United States group may have child subcategories of groups for each state, and states may have further group subcategories by county or zip code. Likewise, the Asia Pacific group may have its own subcategories. Other examples of groups might align with functional departments or teams within a tenant's business: accounting, human resources, information technology, sales, marketing, engineering, etc. The Asia Pacific business unit should not see data related to the United States unit. Managers in the human resources department can view payroll data, but their subordinates cannot. A user may be assigned to zero-to-many groups.

Hierarchy 450 can be a data structure representing a relationship between a parent and a set of children. A node (member) in the hierarchy can be statically and dynamically defined, as well as the set of children. A parent is any member that references one or more children. A child is any member that references a parent. Each member can contain any set of attribute data (commonly stored as a JSON object) or a command that identifies the attribute data (a command within the system) or a reference to any entity in the system (including a row reference, a table reference, a role reference, a group reference, a hierarchy reference, others). There are many functions that are implemented and can be implemented that traverse the hierarchy in any number of ways to identify a set of members and return that set as a row-set.

As shown in FIG. 2B, each policy set, such as policy set 420 may include a plurality of policy items such as policy 1-n.

In various embodiments, various users, such as privileged users, policy managers, and the like may be allowed to change policies via a suitable interface. In one example embodiment, such interface may be represented by an application running on a tenant device of a privileged user. Consequently, the privileged user then can be configured to interact with a virtual database system via the interface of such application.

Figure 3A:
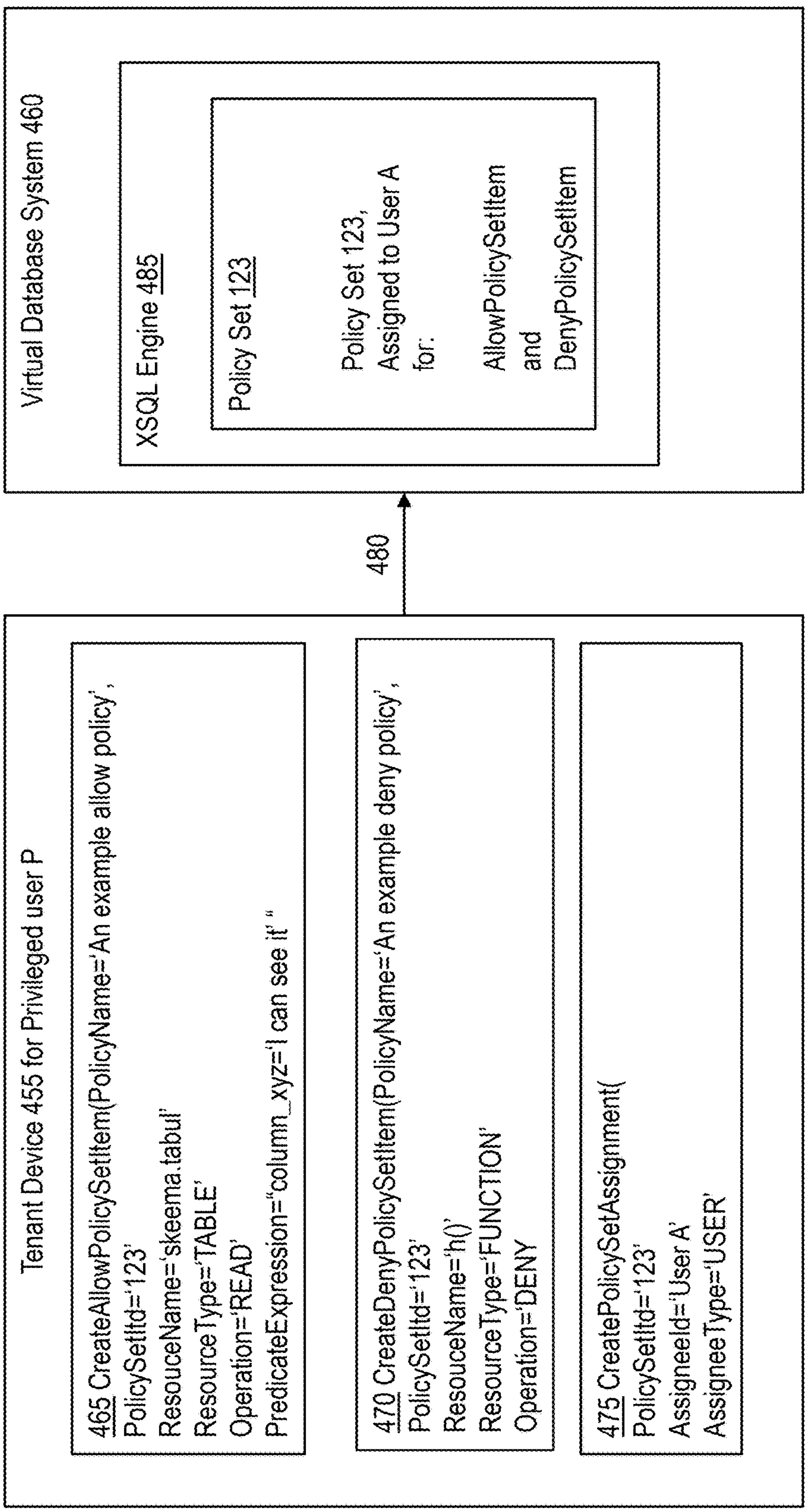
FIG. 3A is a diagram illustrating a process of creating, denying, and assigning of policies to a user, in accordance with various embodiments.
Figure 3B:
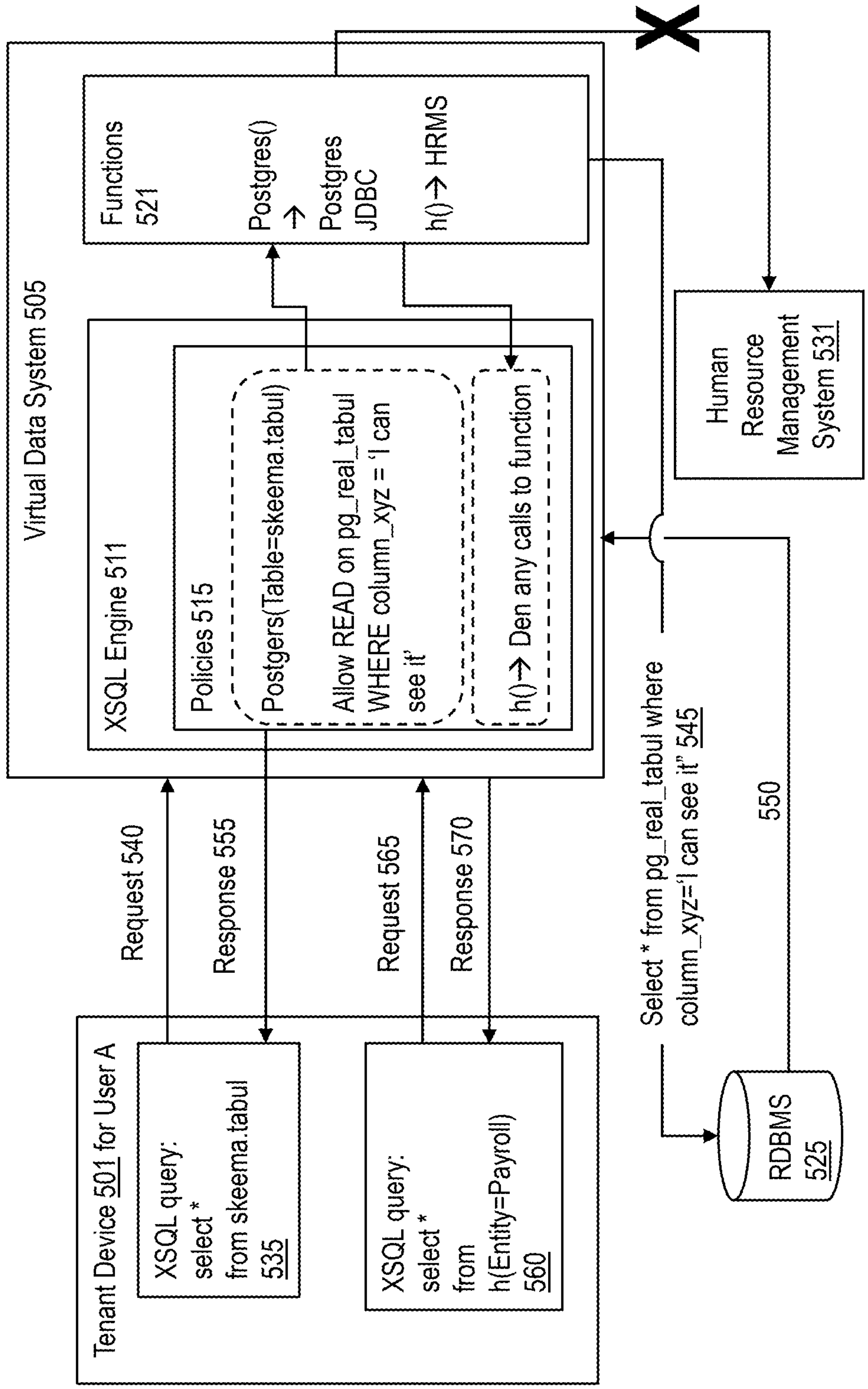
FIG. 3B is a diagram illustrating a process of transacting data between a user and several data repositories, in accordance with various embodiments.

An example system for updating a policy set of a user is shown in FIG. 3A, also FIG. 3B shows requests from the user to two different data repositories. FIG. 3A demonstrates a privileged user, user P, creating and assigning policies to another user, user A, via tenant device 455 within a virtual database system 460. user P defines the operations user A is allowed to perform on two different resources: a table, skeema.tabul, and a function, h( ) Both skeema.tabul and h( ) return row-sets. Virtual database system 460 enforces the policies separately on each resource when user A issues two different XSQL queries. As shown in FIG. 3A, virtual database system 460 includes XSQL Engine 485, which includes policy set 123.

User P uses the CreateAllowPolicySetItem( ) 465 and CreatePolicySetAssignment( ) 475 functions to define policies in policy set 123 in virtual database system 460 and assign policy set 123 to user A. Privileged users, such as user P, may perform system administration and other configuration tasks within virtual database system 460. User P could be a business administrator, IT administrator, software developer, or systems administrator who manages and maintains one or more tenants in virtual database system 460.

As shown in FIG. 3A, CreateAllowPolicySetItem( ) 465 function call defines a policy that allows a holder of the policy to read, i.e., perform selection on, data rows found in the table skeema.tabul. An additional policy restriction is defined in the PredicateExpression parameter, allowing the holder to view only rows from skeema.tabul containing the value "i can see it" in the column, column_xyz.

A second CreateDenyPolicySetItem( ) 470 function call defines a policy that explicitly denies access to the h( ) function, preventing any user assigned to the policy from executing the h( ) function. The CreatePolicySetAssignment( ) 475 function call assigns the policy set containing the two new policy items to User A. This assignment gives User A read access to certain rows in skeema.tabul accessed via the Postgres( ) function, while explicitly denying access to function h( ).

In various embodiments, policies and related functions can have different metadata, parameter names and values, properties, attributes, policy groupings, etc., and may allow for the assignment of policies to entities other than direct assignments to users. The policies are sent to virtual database system 460 via a request 480, as shown in FIG. 3A.

FIG. 3B illustrates the process of a user, via tenant device 501, interacting with the virtual database system 505 to submit requests to access data storage units such as RDBMS 525 and Human Resources Management System 531.

In an example embodiment, User A, operating tenant device 501, has restricted privileges in the virtual database system 505. User A sends the first request, an XSQL query 535, corresponding to the command "SELECT*FROM skeema.tabul." This XSQL query 535 is sent as request 540 to the virtual database system 505. The virtual database system 505 utilizes its XSQL engine 511, which references policies 515 to determine if the XSQL query 535 should be permitted. The policies allow a READ operation on pg_real_tabull where the column column_xyz equals "i can see it." Such operation is performed by either a Postgres function from functions 521 via a statement Postgres( )→Postgres JDBC or using a function h( ) via h( )>HRMS. Here JDBC stands for Java Database Connectivity driver, and function h is a function for interacting with the human resource management system (HRMS).

Consequently, the XSQL query 535 is permitted, and a federated query 545, which is a distributed query that accesses data across multiple data sources, with the command "SELECT*FROM pg_real_tabul WHERE column_xyz='i can see it'" is sent to the RDBMS 525. The RDBMS 525 returns the results 550 to the virtual database system 505, which then sends the query results 555 back to User A.

As shown in FIG. 3B, table skeema.tabul is located in a relational database data storage unit (RDBMS 525) and is programmed in virtual database system 505 to use the function, Postgres( ) Virtual database system 505 is authorized and configured to communicate with an external Postgres database instance on behalf of users. Function h( ) on the other hand, is programmed to transfer data between the VDS and a popular web-based, Software-as-a-Service (SaaS) human resources management system (HRMS) using public RESTful APIs published by the HRMS vendor. Virtual database system 505 has also been granted the necessary credentials and configuration information needed to communicate with the HRMS. In various cases, user P and user A may not be aware that the two queries made to virtual database system 505 will retrieve data from Postgres and the HRMS.

In various cases, when user A submits queries 535 and 560 via corresponding requests 540 and 565, as shown in FIG. 3B, XSQL engine 511 may optimize each XSQL query, and further, as a part of the optimization, determine if user A has been granted read permissions on skeema.tabul and h( ) Further virtual database system 505 can make other optimizations to these queries. As shown in FIG. 3B and described above, user A has the permission to perform selection on skeema.tabul, and the XSQL engine recomposes the query to include the predicate expression from the first policy and replaces the SQL query with a new Postgres( ) function node. The Postgres( ) function node submits the recomposed query to the Postgres database. Postgres returns a row-set to virtual database system 505, which in turn sends a response with the row-set (e.g., results 555) to User A. The row-set contains only rows where column_xyz matches the string "i can see it".

For the select query on h( ) (query 560) XSQL engine 511 determines that user A's policy assignments deny access to the h( ) function. Instead of recomposing and sending the second query to the HRMS, virtual database system 505 rejects query 560 and sends response 570 informing user A that access has been denied to h( ).

Figure 4:
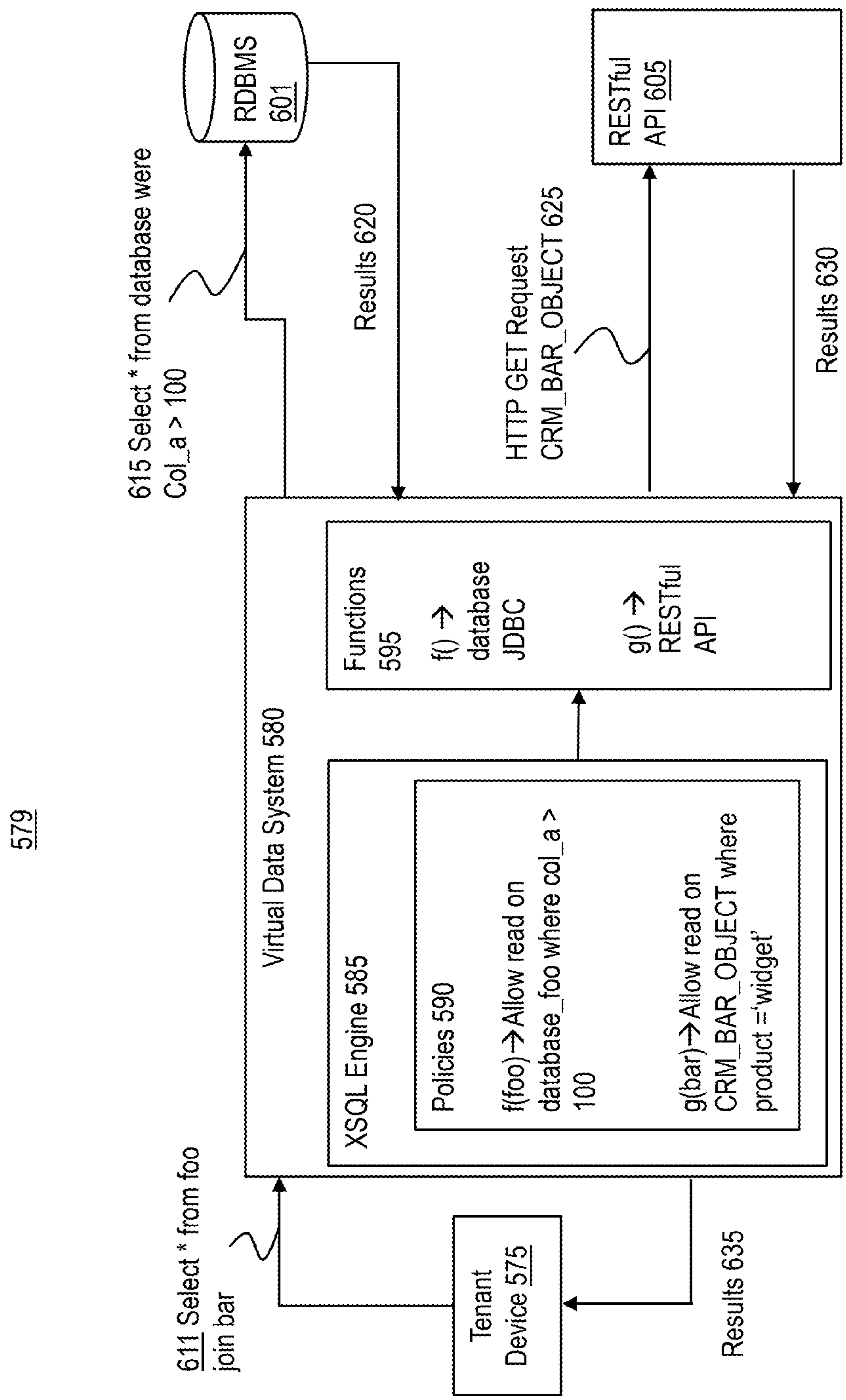
FIG. 4 is another diagram illustrating a process of transacting data between a user and several data repositories, in accordance with various embodiments.

FIG. 4 shows an example process of a user, via tenant device 575 submitting a single XSQL statement to retrieve a row-set by joining two different data stores external to a virtual database system 580. Virtual database system includes XSQL engine 585, which includes policies 590. Further, functions 595 are being part of virtual database system 580. FIG. 4 shows a first data storage unit RDBMS 601 and a second data storage unit RESTful API 605.

FIG. 4 shows a diagram 579 which illustrates a process by which tenant device 575 interacts with virtual database system 580 to access data from different storage units based on defined policies and functions. FIG. 4 illustrates the execution of a single XSQL statement to retrieve a row-set from two different data stores RDBMS 601 and RESTful API 605, that are external to a virtual database system 580.

A user submits XSQL query 611, "select*from foo join bar" to virtual database system 580. XSQL query 611 joins two virtual tables, foo and bar, in a single SELECT statement.

As an example, assume that a user (user A) of tenant device 575 has been assigned policies allowing read access with row-level predicate expression restrictions on each table. Virtual database system 580 receives XSQL query 611 and determines which functions the query uses and if the user who issued the query has any policies assigned to the foo and bar tables. The f( ) and g( ) functions can be Java classes within virtual database system 580. Each function has its own implementation details, but these can be transparent to end users. Users reference foo and bar as tables in XSQL statements, using the same syntax, regardless of table name or function. Function f( ) accesses a database (e.g., an Oracle database) and takes as input the virtual table, foo. Function g( ) accesses objects within a third-party Customer Relationship Management (CRM) SaaS platform and takes as input the virtual table, bar.

In various embodiments, there could be other metadata and configuration details that can be collected by virtual database system 580, such as user credentials, server names, connection configuration settings, etc., associated with the data stores referenced by the f( ) and g( ) functions for tables foo and bar, but these are not pertinent other than to understand virtual database system 580 provides levels of abstraction that insulate end users from knowing anything other than they are referencing a "table" in a SQL query. End users, e.g., developers and systems administrators, may be aware of and even configure the additional metadata details and that the XSQL query interacts with a database and the CRM application, but most users do not require this knowledge when issuing queries to virtual database system 580.

Before virtual database system 580 can submit requests to the database and the CRM application to retrieve data for foo and bar, using f( ) and g( ) respectively, virtual database system 580 identifies if policies assigned to the user allow READ access on foo and bar and if those policies have any predicate expressions to restrict which rows the user can see. The user has READ access to both foo and bar. Additionally, table foo has a policy predicate expression to show only rows where "col_a>100". Table bar has a policy predicate expression to show only rows where "product='widget'".

Virtual database system 580 may be aware of the policies assigned to the user for each table. Virtual database system 580 evaluates whether to allow or deny XSQL query 611 based on the policy information it retrieved for the user and also applies the policy predicate expressions to a graph of XSQL query 611; either by federating the predicate expressions to the functions f( ) for the database and g( ) for CRM or by enforcing the predicate expressions after the functions have fetched the row-sets from the database and CRM into virtual database system 580.

Virtual database system 580 recomposes the XSQL query into the forms, dialect, API calls, and other states that may be required by a database and the CRM application in this example. Function f( ) is responsible for communicating with a relational database (e.g., Oracle relational database) via JDBC. Function g( ) communicates with the CRM application via the vendor's public RESTful API.

In XSQL query 611, "select*from foo join bar", virtual database system 580 identifies the parts of the query to recompose into database's SQL dialect and the parts to recompose into the form required by the CRM API. Virtual database system 580 also attaches any policy predicate expressions to the recomposed query if the expressions can be federated to the relational database or the CRM application. In some cases, virtual database system 580 can federate the policy predicate expression on foo to the relational database. Federating the policy predicate expression means pushing down specific filtering criteria directly to a data source (e.g., relational database residing on RDBMS 601), allowing the relational database to handle the filtering before returning the results. This can improve efficiency by reducing the amount of data transferred back to virtual database system 580. This means that any filtering criteria specified in the policy can be included in the SQL query sent to the relational database. For example, if the policy includes a predicate expression like "col_a>100," virtual database system 580 can modify the SQL query sent to the relational database to include such condition. For instance, the original query can be: "select*from foo join bar;" and the federated query for oracle can be: "select*from oracle_table_foo where col_a>100."

In an example implementation, the XSQL engine 585 recomposes XSQL query 611 to database SQL for RDBMS 601 and includes the policy predicate expression on foo:

select*from foo join bar;
XSQL engine 585 translates to:
select*from f(foo) join f(bar);
XSQL engine 585 translates to:
select*from f(foo where col_a>100) join f(bar);
XSQL engine 585 translates to:
select*from (select*from oracle_table_foo where col_a>100) join f(bar).

Resulting query can be split in a query 615 "select*from (select*from oracle_table_foo where col_a>100)" and send to RDBMS 601 for retrieval of data. In response, results 620 may be generated and returned to virtual database system 580. Further, the XSQL engine 585 recomposes XSQL query 611 for CRM RESTful API 605 and may exclude the policy predicate expression on bar:

select*from foo join bar;
XSQL engine 585 translates to:
select*from f(foo) join g (bar);
XSQL engine 585 translates to:
select*from f(foo) join g (select columns1 . . . n from crm_bar_object);

Here, g ( . . . ) from above is a call to:

CRM_REST_API Function(columns1 . . . n, crm_bar_object);

The call CRM_REST_API_Function(columns1 . . . n, crm_bar_object) can be translated into a query 625 of "HTTP GET Request CRM_BAR Object" and results 630 can be returned to virtual database system 580.

Virtual database system 580 submits each recomposed query to the database and CRM applications, respectively. Each external data store, if successful, returns responses to virtual database system 580 containing the row-sets from each system.

In some cases, portions of the XSQL query cannot be federated and recomposed to f( ) and g( ) For example, the policy predicate on bar may not be federated. The JOIN operation between foo/f( ) and bar/g( ) in cases like this is then performed by virtual database system 580 since data must be fetched from database RDBMS 601 and the RESTful API 605 data storage. In such case, row-sets from the two federated queries are returned to virtual database system 580, after which virtual database system 580 applies the policy predicate "where product='widget'" to the row-set retrieved from RESTful API 605. Next, virtual database system 580 performs the JOIN operation on the two row-sets and sends the final query results 635 to the user who issued XSQL query 611.

In various embodiments, hierarchies can be used to apply policies to a dynamic set of users when accessing data within a table. For example, a user may submit the XSQL query, "select*from foo" to a virtual database system. The XSQL query accesses the virtual table foo in a single select statement. Assume the user is a member of the group named "widget group," a member of the hierarchy "Associate Hierarchy," and is assigned at the "Team 5" level of the hierarchy. Membership within either group or hierarchy can be statically or dynamically associated.

The virtual database system receives the XSQL query and determines which functions the query uses and whether any policies apply to the foo table. Once it is established that the table foo has policies, the next step is to determine which set of users are affected by the policy. In this case, a query such as:

select userName from ShowGroup(GroupName='Widget Group') union select userName from ShowHierarchy (HierarchyName='Associate Hierarchy', Attribute='Team 5');

can be used.

The virtual database system executes the query to retrieve the set of users that define the current scope of the policy item. If the current user is in this list, the policy system follows the same process described in the previous examples to apply any applicable policy predicates to the command graph.

Figure 5:
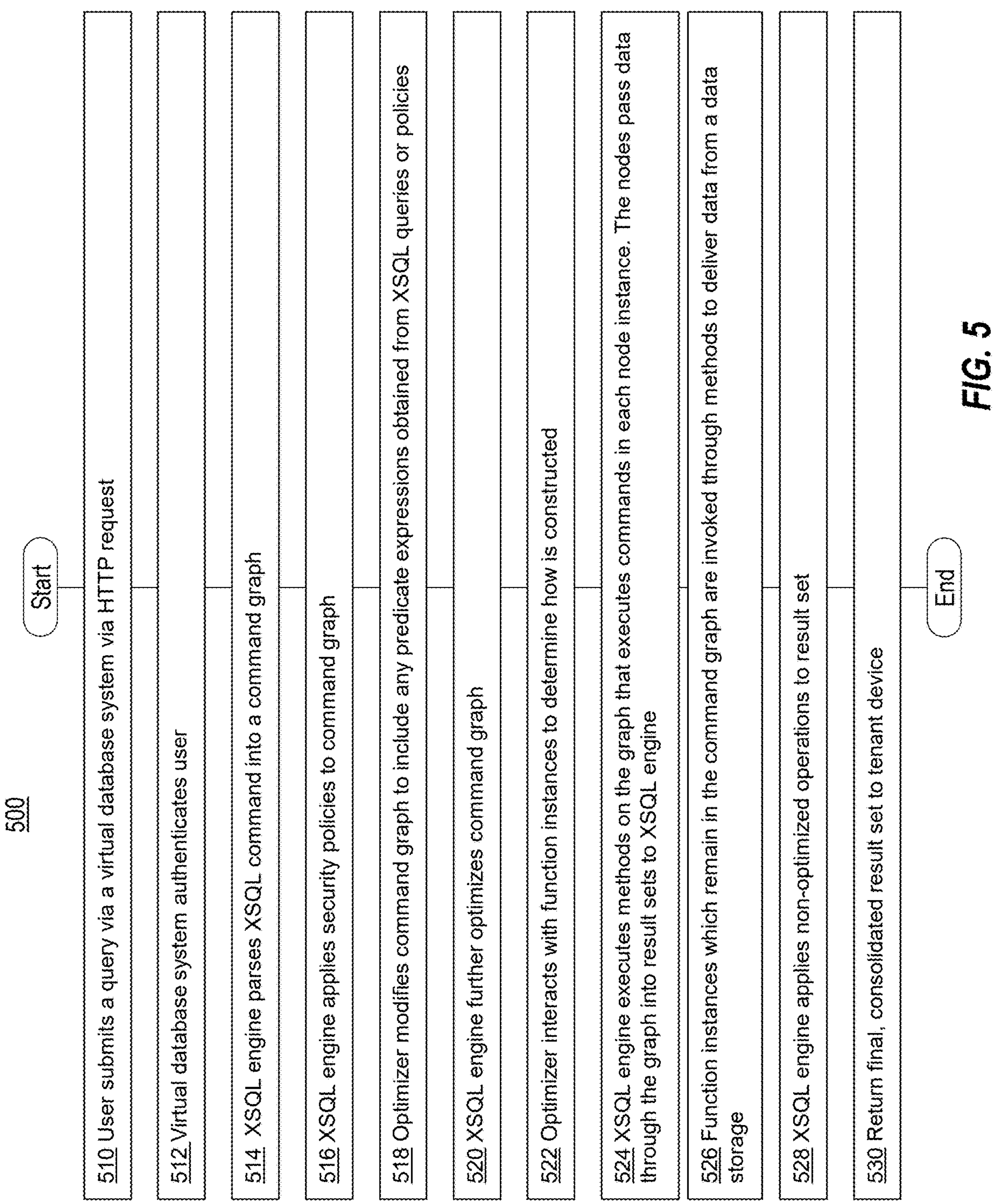
FIG. 5 is a method of transacting with data repositories via a virtual database system, in accordance with various embodiments.

FIG. 5 shows a flowchart describing a method 500 for obtaining results using a virtual database system to communicate with various data repositories. The steps of method 500 are performed by a virtual database system, such as virtual database system 105 shown in FIG. 1A, which includes components like parser 115, optimizer 120, and policy system 130.

Method 500 begins at step 510 with the submission of a query to the virtual database system. For example, a user tenant device submits a query via an HTTP REST request, which includes either login credentials or a valid session ID. The tenant device might use ODBC (Open Database Connectivity) drivers or JDBC (Java Database Connectivity) drivers instead of REST directly. As an example, the user can issue the XSQL query:

select employee_id, first_name, last_name from hr.employee where Uppercase (last_name)='SMITH' order by employee_id desc.

At step 512, method 500 includes authenticating the user with the virtual database system. The virtual database system is configured to reject the login attempt if the user's credential or session ID is invalid. If the credentials or session ID are valid, the virtual database system routes the query to the XSQL engine.

At step 514, method 500 includes parsing the received query. The XSQL engine is configured, via a parser, to parse the XSQL command into a command graph. For example, in the example XSQL query, the "hr.employee" table uses the function, hr( ) and has been programmed within an implementation language as a class of which virtual database system can create an instance. That class has been programmed to communicate with a relational database storage unit. The actual table in the relational database is named COMPANY_EMPLOYEE_TABLE. Thus, virtual database system is configured to parse the example XSQL query and substitute "hr.employee" name with the name of the actual table.

At step 516, method 500 includes applying policies to the command graph generated at step 514. The policies are applied to the command graph to evaluate if the user has been assigned any policies for each resource needed to execute the XSQL query. The virtual database system will reject the query if no policy exists (implicit deny) on a resource or if a policy explicitly denies access to one or more resources. If a policy exists, the XSQL engine, such as XSQL engine 110 shown in FIG. 1A, will apply the existing policy. For example, if the policy allows access to the hr.employee table in the virtual database system, such access will be granted to the user.

At step 518, method 500 includes modifying the command graph via an optimizer, such as optimizer 120 shown in FIG. 1A, to include any predicate expressions from policies. For instance, in the example XSQL query above, the command statement "where Uppercase (last_name)='SMITH'" is a predicate expression for limiting row-level access to rows where Uppercase (last_name)='SMITH'. If an additional predicate expression is provided in the query request, such as "where Uppercase (first_name)='JOHN'" for limiting row-level access to rows where Uppercase (first_name)='JOHN' in addition to the last name being "SMITH," the optimizer modifies the command graph, effectively changing the query to include the additional predicate expression limitation.

At step 520, the optimizer further optimizes the command graph. For instance, in the above example XSQL query containing "where Uppercase (last_name)='SMITH'" and "where Uppercase (first_name)='JOHN'," Uppercase is an XSQL scalar function that does not exist in the relational database storage unit but one that the XSQL engine can map to a function in the relational database storage unit. The XSQL engine can recompose and federate the query to the relational database storage unit. The expected result of this scenario is that the virtual database environment will return only rows from the COMPANY_EMPLOYEE_TABLE in the relational database storage unit that have last_name values equal to 'SMITH' (as requested in the tenant user's query) and first_name values equal to 'JOHN' (as specified by the policy) to the tenant device user who submitted the XSQL query.

At step 522, the optimizer interacts with function instances to determine how the graph is constructed. At step 524, the XSQL Engine executes methods on the graph, which executes code in each node instance. The nodes pass data through the graph into row-sets to the XSQL engine. In the illustrative example of the XSQL query above, the XSQL Engine uses the virtual database system function, hr( ) to retrieve row-sets from the relational database storage unit. The XSQL Engine replaces the XSQL table name with the actual table name in the relational data storage unit, applies the policy predicate identified to the recomposed query, attaches the sort clause, and federates the Uppercase( ) XSQL scalar function call to its equivalent scalar function, UPPER( ) in the relational data storage unit. For the example XSQL query:

select employee_id, first_name, last_name from hr.employee where

Uppercase (last_name) 'SMITH' order by employee_id desc;

The optimized XSQL query updated for the relational database can then be:

select employee_id, first_name, last_name from

COMPANY_EMPLOYEE_TABLE where Upper (last_name)=

'SMITH' and UPPER (first_name) 'JOHN' order by employee_id desc;

At step 526, the function instances that remain in the command graph are invoked through methods to deliver data from the associated data storage unit. Further, at step 528, the XSQL engine applies any non-optimized operations to the row-set. In this example, no further optimizations are applied in this step since the virtual database system fully federated the original XSQL query to the relational database storage unit. Finally, at step 530, the virtual database system returns the final, consolidated row-set to the tenant device.

Figure 6:
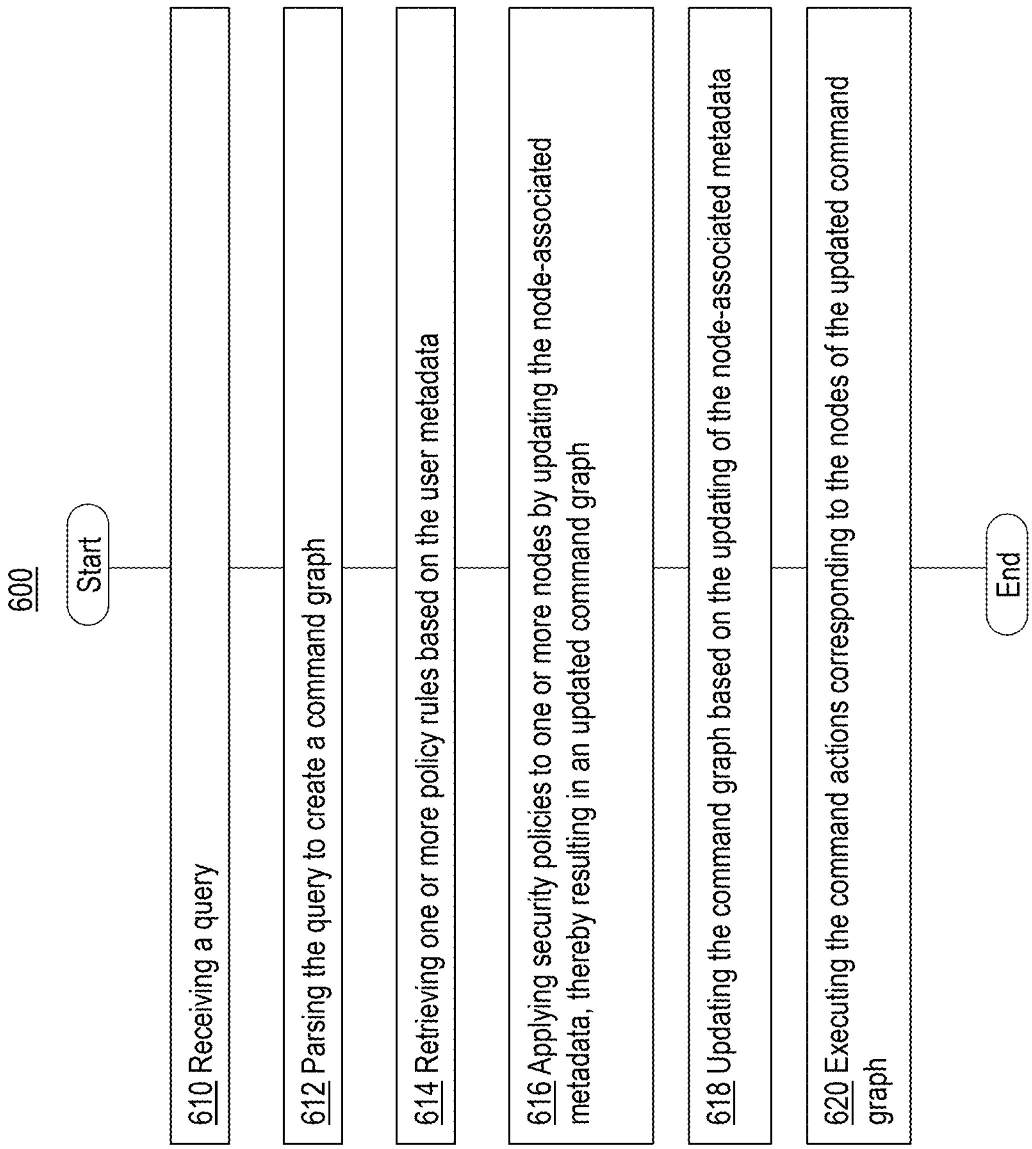
FIG. 6 is another method of transacting with data repositories via a virtual database system, in accordance with various embodiments.

In various embodiments, another method 600 is shown in FIG. 6. Method 600 describes transacting data with a data repository via a virtual database system is disclosed. Such method 600 may be similar to method 500, as shown in FIG. 5. Method 600 may be performed by a virtual database system including any of virtual database system components.

Method 600 includes, at step 610, receiving a query, wherein the query includes a request for transacting data with one or more data repositories. Such request can refer to operations such as selecting, inserting, updating, or deleting data within one or more data repositories. Further, the request for transacting data includes a user metadata. The user metadata can be any suitable information about the user issuing the query, such as their identity, roles, and permissions.

Method 600 includes, at step 612, parsing the query into a command graph. The command graph includes nodes, where each node represents a specific action to be performed, such as retrieving data or applying a filter, as well as node-associated metadata. Node-associated metadata describing a behavior of the command action. Thus, node-associated metadata describes how each node behaves, including what specific operations it will carry out.

Method 600 includes, at step 614, retrieving one or more policy rules based on user metadata. For example, a virtual database system may utilize the user's metadata to fetch applicable policy rules that define what the user is allowed to do. Further, at step 616, method 600 includes applying security policies to one or more nodes. These policies are applied by updating the metadata associated with each node in the command graph. The application of the security policies ensures that the actions performed comply with the user's permissions.

In various embodiments, security policies may include policies that either allow or deny access to data within one or more data repositories. Furthermore, some security policies may involve predicate-based access control. Such policies are designed to allow access to data based on the positive evaluation of one or more specific conditions. For instance, a predicate-based policy might allow access to a first set of data within a repository, characterized by a first set of parameters, while denying access to a second set of data within the same repository, characterized by a different set of parameters. For instance, consider a healthcare database with a table named patients. This policy might allow doctors to access the medical_history column for patients they are treating (first set of parameters: patients assigned to the doctor), but deny access to the medical_history column for patients they are not assigned to (second set of parameters: patients not assigned to the doctor).

In some cases, the specific conditions for access may depend on the user's role, membership in a particular user group, or level within an organizational hierarchy. Furthermore, certain conditions may not be user-specific but rather based on other factors, such as the frequency of data access, the geographical location of the user, specific events (e.g., access being allowed only on Mondays), or similar criteria.

Method 600 further includes, at step 618, updating the command graph based on the updating of the node-associated metadata. The updating process may include changing XSQL commands represented by nodes in the command graph based on security policies. For example, if a user is allowed to access only columns 10 to 12 of the data, the original XSQL command "SELECT*FROM employees WHERE salary >10000" can be transformed to "SELECT column10, column11, column12 FROM employees WHERE salary >10000" in accordance with the security policies. This example is illustrative, and any other suitable changes to the nodes can be made based on security policies.

For instance, consider a table named "employees" with columns "employee_id," "name," "salary," "department," and "ssn" (Social Security Number). Only HR managers may be allowed to view the "ssn" column, while other users should have this column masked or excluded from the query results. Thus, for non-HR personnel, the XSQL command "SELECT employee_id, name, salary, department, ssn FROM employees WHERE salary >10000" can be converted to "SELECT employee_id, name, salary, department, '--***' AS ssn FROM employees WHERE salary >10000."

Method 600 concludes by executing the command actions corresponding to the nodes of the updated command graph Such actions defined by the nodes in the updated command graph are executed, resulting in the desired data transaction.

In various embodiments, request of the query includes one or more XSQL commands. These commands may perform data transactions that can include uploading the data to the data repository or downloading the data from the data repository. Further, such transactions may include making a selection of which data from the data repository is downloaded, inserting data into the data repository, updating data in the data repository, or deleting data in the data repository.

In various embodiments, node-associated metadata describes permissions for performing actions when transacting data. Furthermore, user metadata may include roles, groups, or hierarchies for one or more users, and wherein the policy rules determine permissions for performing actions when transacting data for users grouped by the at least one of roles, groups, or hierarchies. The permission may include one of a row-level access control, a column-level access control, a predicate-based access control, a role-based access control, a group-based access control; a hierarchy-based access control, or a dynamic access control. For example, row-level access control is configured to restrict access to specific rows of data, column-level access control is configured to restrict access to specific columns of data, predicate-based access control is configured to use conditions (predicates) to control access. An example predicate XSQL expression may be "select*where Uppercase (last_name="SMITH")." Further, role-based access control allows access to data for users based on user roles, group-based access control allows access to data for users based on user groups, and hierarchy-based access control allows access to data based on user hierarchy levels. Furthermore, dynamic access control can be configured to allow for access rules that change based on various conditions. For example, such condition can allow a control if data has not been modified in the past hour by any other user.

In some cases, policies can be reduced to a canonical form representing a union of access allowances and prohibitions, with access prohibitions taking precedence in the event of a conflict between policy rules. For example, rules are defined to resolve conflicts between policies based on user metadata.

this ensures a clear and consistent approach to handling access permissions and restrictions.

In various cases, when a command graph is constructed based on a user query, it can be optimized to enhance efficiency. The optimization process involves reordering nodes, joining nodes, and/or modifying one or more nodes to improve the efficiency of the command actions associated with these nodes, without altering the results of those command actions. This ensures that the command graph operates more effectively while maintaining the integrity of the query results.

In some cases, optimizing the command graph further includes obtaining predicate-based access control policies and modifying command actions of one or more nodes to incorporate predicate based access control policies. Optimizing the command graph also can involve ensuring that the policies described within the graph are independently enforceable, while also expressing them more efficiently by relating them to optimized sections of the graph. Similar to tree graph optimizations, this process may involve rewriting and reorganizing the graph. This optimization can be an iterative process, continually refining the graph's structure and improving its efficiency. For example, graph optimization can be performed multiple times until a specified optimization criterion is met. For example, one of the optimization criteria may include not being able to optimize the graph further.

In various embodiments, before executing commands defined in the command graph, the virtual database system converts these commands to be suitable for the specific data repository with which data is transacted. This conversion may involve replacing generic functions with corresponding functions specific to the data repository or substituting abstract table names with the actual table names of the data repository.

Additionally, as described in relation to FIG. 3A, the virtual database system can allow privileged users to update policy rules. This policy updating process may include actions such as creating an allowance policy rule for access to a particular data resource for one or more users, creating a denial policy rule for access to a particular data resource for one or more users, or assigning one or more policy rules to one or more users.

3. Implementation Example—Hardware Overview

According to one embodiment, the techniques described herein are implemented by at least one computing device. The techniques may be implemented in whole or in part using a combination of at least one server computer and/or other computing devices coupled using a network, such as a packet data network. The computing devices may be hard-wired to perform the techniques or may include digital electronic devices such as at least one application-specific integrated circuit (ASIC) or field programmable gate array (FPGA) that is persistently programmed to perform the techniques or may include at least one general purpose hardware processor programmed to perform the techniques pursuant to program instructions in firmware, memory, other storage, or a combination. To accomplish the described techniques, such computing devices may combine custom hard-wired logic, ASICs, or FPGAs with custom programming. The computing devices may be server computers, workstations, personal computers, portable computer systems, handheld devices, mobile computing devices, wearable devices, body-mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 7:
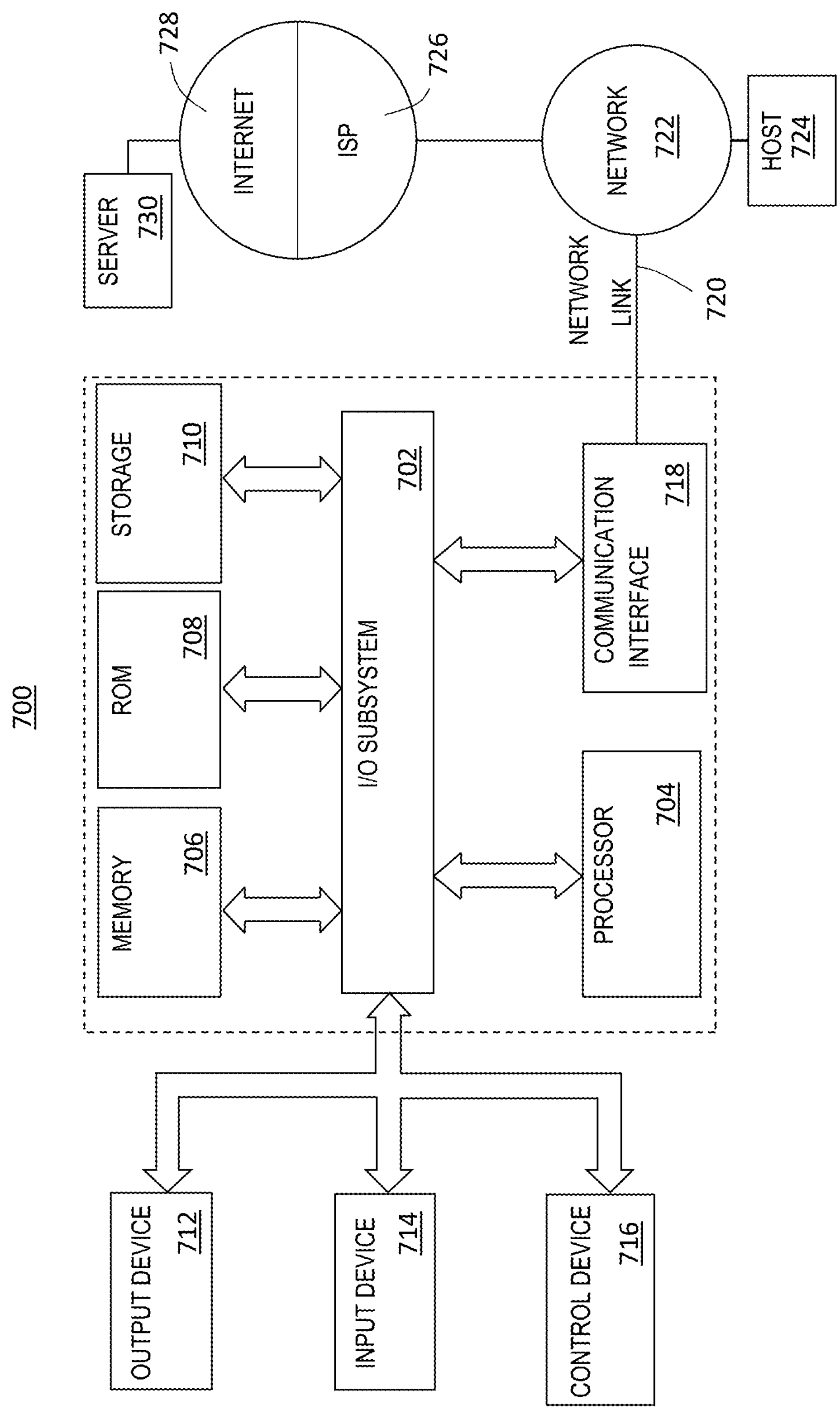
FIG. 7 illustrates a computer system with which methods for transacting with data repositories via a virtual database system could be implemented.

FIG. 7 is a block diagram that illustrates an example computer system with which an embodiment may be implemented. In the example of FIG. 7, a computer system 700 and instructions for implementing the disclosed technologies in hardware, software, or a combination of hardware and software, are represented schematically, for example, as boxes and circles, at the same level of detail that is commonly used by persons of ordinary skill in the art to which this disclosure pertains for communicating about computer architecture and computer systems implementations.

Computer system 700 includes an input/output (I/O) subsystem 702, which may include a bus and/or other communication mechanism(s) for communicating information and/or instructions between the components of the computer system 700 over electronic signal paths. The I/O subsystem 702 may include an I/O controller, a memory controller, and at least one I/O port. The electronic signal paths are represented schematically in the drawings, such as lines, unidirectional arrows, or bidirectional arrows.

At least one hardware processor 704 is coupled to I/O subsystem 702 for processing information and instructions. Hardware processor 704 may include, for example, a general-purpose microprocessor or microcontroller and/or a special-purpose microprocessor such as an embedded system or a graphics processing unit (GPU), or a digital signal processor or ARM processor. Processor 704 may comprise an integrated arithmetic logic unit (ALU) or be coupled to a separate ALU.

Computer system 700 includes one or more units of memory 706, such as a main memory, coupled to I/O subsystem 702 for electronically digitally storing data and instructions to be executed by processor 704. Memory 706 may include volatile memory such as various forms of random-access memory (RAM) or other dynamic storage device. Memory 706 also may be used for storing temporary variables or other intermediate information during the execution of instructions to be executed by processor 704. Such instructions, when stored in non-transitory computer-readable storage media accessible to processor 704, can render computer system 700 into a special-purpose machine customized to perform the operations specified in the instructions.

Computer system 700 includes non-volatile memory such as read-only memory (ROM) 708 or other static storage devices coupled to I/O subsystem 702 for storing information and instructions for processor 704. The ROM 708 may include various forms of programmable ROM (PROM), such as erasable PROM (EPROM) or electrically erasable PROM (EEPROM). A unit of persistent storage 710 may include various forms of non-volatile RAM (NVRAM), such as FLASH memory, solid-state storage, magnetic disk, or optical disks such as CD-ROM or DVD-ROM and may be coupled to I/O subsystem 702 for storing information and instructions. Storage 710 is an example of a non-transitory computer-readable medium that may be used to store instructions and data which, when executed by the processor 704, cause performing computer-implemented methods to execute the techniques herein.

The instructions in memory 706, ROM 708, or storage 710 may comprise one or more instructions organized as modules, methods, objects, functions, routines, or calls. The instructions may be organized as one or more computer programs, operating system services, or application programs, including mobile apps. The instructions may comprise an operating system and/or system software; one or more libraries to support multimedia, programming, or other functions; data protocol instructions or stacks to implement TCP/IP, HTTP, or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server, or web client. The instructions may be organized as a presentation, application, and data storage layer, such as a relational database system using a structured query language (SQL) or no SQL, an object store, a graph database, a flat file system, or other data storage.

Computer system 700 may be coupled via I/O subsystem 702 to at least one output device 712. In one embodiment, output device 712 is a digital computer display. Examples of a display that may be used in various embodiments include a touchscreen display, a light-emitting diode (LED) display, a liquid crystal display (LCD), or an e-paper display. Computer system 700 may include other type(s) of output devices 712, alternatively or in addition to a display device. Examples of other output devices 712 include printers, ticket printers, plotters, projectors, sound cards or video cards, speakers, buzzers or piezoelectric devices or other audible devices, lamps or LED or LCD indicators, haptic devices, actuators or servos.

At least one input device 714 is coupled to I/O subsystem 702 for communicating signals, data, command selections, or gestures to processor 704. Examples of input devices 714 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 716, which may perform cursor control or other automated control functions such as navigation in a graphical interface on a display screen, alternatively or in addition to input functions. The control device 716 may be a touchpad, a mouse, a trackball, or cursor direction keys for communicating direction information and command selections to processor 704 and for controlling cursor movement on an output device 712, such as a display. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism, or other control device. An input device 714 may include a combination of multiple input devices, such as a video camera and a depth sensor.

In another embodiment, computer system 700 may comprise an Internet of Things (IoT) device in which one or more of the output device 712, input device 714, and control device 716 are omitted. Or, in such an embodiment, the input device 714 may comprise one or more cameras, motion detectors, thermometers, microphones, seismic detectors, other sensors or detectors, measurement devices or encoders, and the output device 712 may comprise a special-purpose display such as a single-line LED or LCD display, one or more indicators, a display panel, a meter, a valve, a solenoid, an actuator or a servo.

When computer system 700 is a mobile computing device, input device 714 may comprise a global positioning system (GPS) receiver coupled to a GPS module that is capable of triangulating to a plurality of GPS satellites, determining and generating geo-location or position data such as latitude-longitude values for a geophysical location of the computer system 700. Output device 712 may include hardware, software, firmware, and interfaces for generating position reporting packets, notifications, pulse or heartbeat signals, or other recurring data transmissions that specify a position of the computer system 700, alone or in combination with other application-specific data, directed toward host computer 724 or server computer 730.

Computer system 700 may implement the techniques described herein using customized hard-wired logic, at least one ASIC or FPGA, firmware, and/or program instructions or logic which, when loaded and used or executed in combination with the computer system, causes or programs the computer system to operate as a special-purpose machine. According to one embodiment, the techniques herein are performed by computer system 700 in response to processor 704 executing at least one sequence of at least one instruction contained in main memory 706. Such instructions may be read into main memory 706 from another storage medium, such as storage 710. Execution of the sequences of instructions contained in main memory 706 causes processor 704 to perform the process steps described herein. In alternative embodiments, hard-wired circuitry may be used in place of or in combination with software instructions.

The term "storage media," as used herein, refers to any non-transitory media that store data and/or instructions that cause a machine to operate in a specific fashion. Such storage media may comprise non-volatile media and/or volatile media. Non-volatile media includes, for example, optical or magnetic disks, such as storage 710. Volatile media includes dynamic memory, such as memory 706. Common forms of storage media include, for example, a hard disk, solid state drive, flash drive, magnetic data storage medium, any optical or physical data storage medium, memory chip, or the like.

Storage media is distinct but may be used with transmission media. Transmission media participates in transferring information between storage media. For example, transmission media includes coaxial cables, copper wire and fiber optics, and wires comprising a bus of I/O subsystem 702. Transmission media can also be acoustic or light waves generated during radio-wave and infrared data communications.

Various forms of media may carry at least one sequence of at least one instruction to processor 704 for execution. For example, the instructions may initially be carried on a remote computer's magnetic disk or solid-state drive. The remote computer can load the instructions into its dynamic memory and send them over a communication link such as a fiber optic, coaxial cable, or telephone line using a modem. A modem or router local to computer system 700 can receive the data on the communication link and convert the data to a format that can be read by computer system 700. For instance, a receiver such as a radio frequency antenna or an infrared detector can receive the data carried in a wireless or optical signal and appropriate circuitry can provide the data to I/O subsystem 702 such as place the data on a bus. I/O subsystem 702 carries the data to memory 706, from which processor 704 retrieves and executes the instructions. The instructions received by memory 706 may optionally be stored on storage 710 either before or after execution by processor 704.

Computer system 700 also includes a communication interface 718 coupled to a bus or I/O subsystem 702. Communication interface 718 provides a two-way data communication coupling to a network link(s) 720 directly or indirectly connected to at least one communication network, such as a network 722 or a public or private cloud on the Internet. For example, communication interface 718 may be an Ethernet networking interface, integrated-services digital network (ISDN) card, cable modem, satellite modem, or a modem to provide a data communication connection to a corresponding type of communications line, for example, an Ethernet cable or a metal cable of any kind or a fiber-optic line or a telephone line. Network 722 broadly represents a local area network (LAN), wide-area network (WAN), campus network, internetwork, or any combination thereof. Communication interface 718 may comprise a LAN card to provide a data communication connection to a compatible LAN, a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 718 sends and receives electrical, electromagnetic, or optical signals over signal paths that carry digital data streams representing various types of information.

Network link 720 typically provides electrical, electromagnetic, or optical data communication directly or through at least one network to other data devices, using, for example, satellite, cellular, Wi-Fi, or BLUETOOTH technology. For example, network link 720 may connect through network 722 to a host computer 724.

Furthermore, network link 720 may connect through network 722 or to other computing devices via internetworking devices and/or computers operated by an Internet Service Provider (ISP) 726. ISP 726 provides data communication services through a worldwide packet data communication network called Internet 728. A server computer 730 may be coupled to Internet 728. Server computer 730 broadly represents any computer, data center, virtual machine, or virtual computing instance with or without a hypervisor, or computer executing a containerized program system such as DOCKER or KUBERNETES. Server computer 730 may represent an electronic digital service that is implemented using more than one computer or instance and that is accessed and used by transmitting web services requests, uniform resource locator (URL) strings with parameters in HTTP payloads, API calls, app services calls, or other service calls. Computer system 700 and server computer 730 may form elements of a distributed computing system that includes other computers, a processing cluster, a server farm, or other organizations of computers that cooperate to perform tasks or execute applications or services. Server computer 730 may comprise one or more instructions organized as modules, methods, objects, functions, routines, or calls. The instructions may be organized as one or more computer programs, operating system services, or application programs, including mobile apps. The instructions may comprise an operating system and/or system software; one or more libraries to support multimedia, programming, or other functions; data protocol instructions or stacks to implement TCP/IP, HTTP, or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server computer 730 may comprise a web application server that hosts a presentation layer, application layer, and data storage layer, such as a relational database system using a structured query language (SQL) or no SQL, an object store, a graph database, a flat file system or other data storage.

Computer system 700 can send messages and receive data and instructions, including program code, through the network(s), network link 720, and communication interface 718. In the Internet example, server computer 730 might transmit a requested code for an application program through Internet 728, ISP 726, local network 722, and communication interface 718. The received code may be executed by processor 704 as it is received and/or stored in storage 710 or other non-volatile storage for later execution.

The execution of instructions, as described in this section, may implement a process in the form of an instance of a computer program that is being executed and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 704. While each processor 704 or core of the processor executes a single task at a time, computer system 700 may be programmed to implement multitasking to allow each processor to switch between tasks that are being executed without having to wait for each task to finish. In an embodiment, switches may be performed when tasks perform input/output operations when a task indicates that it can be switched or on hardware interrupts. Time-sharing may be implemented to allow fast response for interactive user applications by rapidly performing context switches to provide the appearance of concurrent execution of multiple processes. In an embodiment, for security and reliability, an operating system may prevent direct communication between independent processes, providing strictly mediated and controlled inter-process communication functionality.

4. Appendix Functions and Their Definitions

The following list contains examples of policy related functions implemented as Java classes in the VDS. Function names, parameters, scope, behavior, and descriptions are examples of a possible implementation of policies in a virtual system. Privileged users can invoke the functions in a number of ways, but not limited to, command line editors, GUI applications, from within the VDS system code, external scripts/programs/applications, and others. Each function performs logical operations in the VDS and returns a status row-set to the caller. Status row-sets tell the user if the function executed successfully or if an error occurred and other summary information about a function's execution. For example, the row-set might contain the unique identifier generated by the VDS when creating a new policy set.

A VDS has different categories of functions. Functions can perform create, read, update, and delete (CRUD) operations to add, modify and remove tables and domain objects from the VDS. The VDS supports common DML and DDL statements present in ANSI SQL and can apply those concepts to functions, tables, and domain objects. Other functions can perform some operations within the VDS (fetch data, send an email, enable a schedule, FTP a file, query data from an external data source, run a workflow, etc.). All functions, regardless of the operations they perform, return a row-set to the caller.

Users can invoke "CREATE" functions to define instances of domain objects in a VDS. Domain objects are stored in persistent storage as metadata, such as a relational database, and can be later retrieved for use within a VDS. For example, the CREATE functions described below are used to define different policy sets, policy set items, and policy assignments. Depending on the use case, CREATE functions may take zero to many input parameters.

"UPDATE" functions take one to many input parameters. Users can invoke UPDATE functions to modify metadata for an instance of a domain object within a VDS. These functions retrieve one or more domain objects from VDS persistent storage, modify the domain object metadata, and store the modified domain object in a persistent storage unit. For example, a user may want to rename a policy set from "ABC Policy Set" to "XYZ Policy Set" or change a policy set item to allow read operations on a table instead of write operations.

"DELETE" and "DROP" functions take one to many input parameters to identify and remove one or more domain objects from VDS persistent storage. For example, a software application may be triggered to remove all policy set assignments made to a group of people whose employer has terminated their employment.

"SHOW" functions return a row-set containing metadata for one or more domain object instances. Other types of functions can exist within a VDS. A user can explicitly set input parameters to functions by providing literal values. For example, the following command can be used: DoSomething(ParameterExample='a literal string value'). In other cases, a user can use XSQL functions and expressions to dynamically generate input values when a function is called. For example, when using XSQL: DoSomething(ParameterExample=(select employee_id from employees)). Another example of using a function: DoSomething (ParameterExample=f(x)).

DynamicQuery is a parameter found in some functions that allows for additional flexibility by dynamically identifying parameter values to use at runtime when a domain object is referenced. For example, AssignMembersToDomainObject (MemberIds=(select id from f( ))); This command will assign members to the domain object at function runtime. The MemberIds list for the domain object is fixed to the list of IDs returned by f( ) when AssignMembersToDomainObject( ) is executed.

Another Example can be:

AssignMembersToDomainObject (DynamicQuery=(select id from f( )));

Using DynamicQuery, members assigned to the domain object are fluid. Membership is determined by the row-set from f( ) whenever the domain object is referenced. For instance, an administrator may want all "sales managers" to be members of the domain object. As employees who are "sales managers" can change over time with new hires and departures, this dynamic approach ensures that the membership remains current.

Policy Functions

Below are possible input parameters for functions that can be used to control policies for different users:

ResourceName: This parameter refers to the name of the domain object to which a policy set item will be applied. In some cases, a wildcard "*" may be used instead of specifying a specific resource name to apply a policy item to all instances of the policy set item's ResourceType. Resource names are unique identifiers for the domain object. For example, "hr.payroll" could be the name of a table resource in a VDS.

ResourceType: This indicates the type of domain object in the VDS to which the policy set item will apply. Available domain object types in a VDS include: CATALOG, CREDENTIAL, CURSOR, DATASOURCE, EMAIL, FILE, FUNCTION, COMMAND, INDEX, LINKED_TABLE, POLICY_ITEM, PREFERENCE, SCHEDULE, SCHEMA, SEQUENCE, SESSION, TABLE, VARIABLE, VIEW, WORKFLOW, UI PAGE, UI PAGE COMPONENT, etc. For example, a privileged user might create a policy set item on the "ReadFile" resource name, where ReadFile is a FUNCTION domain object.

Operation: This parameter defines the action a policy set item will allow or deny. Available operations in a VDS include: ALTER, CREATE, DELETE, DROP, EXECUTE, READ, WRITE. A wildcard "*" can be used to grant or deny all operations supported by a policy set item's resource name and type. For instance, a privileged user might create a policy set item to allow another user to execute the "ReadFile" function or to have write access on the "hr.payroll" table.

PolicySetId: This is the unique identifier for a distinct instance of a policy set. A VDS is responsible for assigning and enforcing unique policy set identifiers when a user or other process creates a policy set.

PolicySetName and Name: These are unique labels provided by a user to identify a policy set. For example, a business administrator may create a policy set called "Policy Set for Sales Managers." The name serves as a business or functional description that is meaningful to the user.

Description: This is additional textual data that can provide context for an instance of a policy set, policy set item, policy set assignment, or other domain objects.

AssigneeId: A policy set must be assigned to a user before it can control access to domain objects and functionality within a VDS. This can be done directly by user assignment or indirectly through roles, groups, or command expressions. The value can be static or generated dynamically at runtime using expressions or evaluation of role, group, and hierarchy memberships. The AssigneeId is a value that might track distinct users of the system or identify a role, policy group, or other type of indirect policy set assignment. As an example, this value is an expression that can evaluate to more than one value. It can be a scalar value, an expression that evaluates to a single value, an expression that evaluates to a list, or a query that fetches the list of ids.

AssigneeType: This determines the category of a policy set holder. Examples include USER, ROLE, RULE, HIERARCHY, and GROUP. For example, an administrator might assign a policy set directly to users, or they might assign policy sets according to roles within a VDS. For instance, assigning “Policy Set ABC” to the “Sales Manager” role means any user assigned to the “Sales Manager” role inherits the permissions and restrictions found in “Policy Set ABC”. This approach requires only one assignment entry to affect all “Sales Managers” versus creating separate assignment records for each user.

Ids: This is a list of unique identifiers in a VDS to identify one or more policy sets. The list can consist of literal values or be generated dynamically using an XSQL expression. Example: DropPolicySet(Ids=(select id from ShowPolicySets( ) where description=‘Bob, please delete these’));

Predicate: Policy set items for some resource types, such as tables and certain functions, support predicate expressions. These are XSQL Boolean expressions controlling row-level access to data for policyholders. When a policyholder runs an XSQL query or command against one or more resources, the VDS applies predicate expressions.

For example, a privileged user may grant a policy set item to User A, allowing them to perform a read operation on the “hr.payroll” table with a predicate expression: “employee_id=SessionEmployeeId( )”. If User A queries “SELECT*FROM hr.payroll”, the VDS will apply the policy predicate, modifying the query to “SELECT*FROM hr.payroll WHERE employee_id=SessionEmployeeId( )”. User A would only see rows from hr.payroll assigned to their employee_id. Similar predicate expressions could be applied to UPDATE and DELETE queries or to row-sets returned by XSQL commands and functions.

Columns: Policy set items for some resource types, such as tables and certain functions, support column-level policy restrictions. For example, a table “Some_Table” with columns COLUMN_A, COLUMN_B, COLUMN_C, COLUMN_D, and COLUMN_E might have a policy set item restricting User A’s access to only COLUMN_A and COLUMN_C. When User A submits the XSQL query “SELECT*FROM Some_Table”, the VDS modifies this to “SELECT COLUMN_A, COLUMN_C FROM Some_Table”, returning data from only the permitted columns. Different policyholders might have varying column restrictions. Column-level restrictions can also be applied to write operations, such as UPDATE.

DefaultValues: These are key/value pairs affecting inserts and updates to columns or other parameters to functions, if applicable. This can be extrapolated to tables that should have default values for a column for a particular set of users.

Below are functions that can be used with the above parameters:

CreatePolicySet( )—Defines a policy set domain object.

Example Syntax: CreatePolicySet(Name=< > [, Description=< >]);

CreatePolicySetAssignment( )—Assigns a policy set to a user, role, group, hierarchy, or relationship.

Example Syntax: CreatePolicySetAssignment(PolicySetName=< >, AssigneeId=< >, AssigneeType=< >);

CreateAllowPolicySetItem( )—This function creates policy set items that allow access to a resource.

Example Syntax: CreateAllowPolicySetItem(ResourceName=< >, ResourceType=< >, Operation=< >, PolicySetId=< >, PolicySetName=< > [, Predicate=< >] [, Columns=< >][, DefaultValues=< >])

CreateDenyPolicySetItem( )—This function creates policy set items that explicitly deny access to a resource and will override any other allowed policies that a user might hold.

Example Syntax: CreateDenyPolicySetItem(ResourceName=< >, ResourceType=< >, Operation=< >, PolicySetId=< >, PolicySetName=< >);

DeletePolicySetAssignment( )—Removes a policy set assignment domain object from the VDS.

Example Syntax: DeletePolicySetAssignment (Ids=<list>);

DeletePolicySetItem( )—Removes a policy set item from a policy set.

Example Syntax: DeletePolicySetItem(Ids=<list>);

DropPolicySet( )—Removes a policy set domain object from the VDS.

Example Syntax: DropPolicySet(Ids=<list>);

ExportPolicySets( ) and ImportPolicySets( )—These functions provide backup and restore capabilities for one or more policy sets and associated policy set items and assignments. Backups can be restored to the same or different VDS. For example, a privileged user export policy sets from a development instance and imports them into a production instance.

```
Example Syntax:
ExportPolicySets(PolicySetNames=<policySetNames>, FilePath=<filePath>);
ImportPolicySet(FilePath=<filePath>);
```

ShowCanonicalPolicy( )—Returns the policies assigned to a given user.

Example Syntax: select*from ShowCanonicalPolicy([AssigneeId=< >];

Show PolicySetAssignments( )—Returns the users, roles, groups, hierarchies, and relationships associated with a policy set.

Example Syntax: select*from ShowPolicySetAssignments(PolicySetId=< >);

ShowPolicySetItems( )—Returns the policy set items found in a policy set.

Example Syntax: select*from ShowPolicySetItems(PolicySetId=< >);

ShowPolicySets( )—Returns a list of all policy sets in a VDS.

Example Syntax: select*from ShowPolicySets (Ids=<list>);

UpdatePolicySet( )—Alters the metadata for a specified policy set.

Example Syntax: UpdatePolicySet(Id=< >, Name=<name> [, Description=< >]);

UpdatePolicySetAssignment( )—Alters the metadata for a specified policy set assignment.

```
Example Syntax: UpdatePolicySetAssignment(Id=<policy_set_assignment_id>,
PolicySetId=<policy_set_id>, AssigneeId=<assignee_id>, AssigneeType=< >);
```

UpdatePolicySetItem( )—Alters the metadata for a specified policy set item.

```
Example Syntax: UpdatePolicySetItem(Id=< >, ResourceName=< >, ResourceType=< >,
Operation=< >, PolicySetId=< >, PolicySetName=< > [, Predicate=< >] [,
Columns=< >] [, DefaultValues=< >]);
```

User Functions

Descriptions of Possible Input Parameters:

UserId—a value that uniquely identifies a distinct user in a VDS. Usually represented in a form understood by users or created in systems outside a VDS (HRMS, ERP, CRM, etc.). Email addresses, employee badge numbers, or government assigned identify numbers are common examples.

Password—a secret a user provides to a VDS for authentication.

LockUser—Boolean value that allows or prevents a user access to a VDS.

Id/Ids—a unique key generated by a VDS to identify a user. The input parameters may take the form of a single value or a list of parameters.

Below are functions that can be used with above parameters:

CreateUser( )—Create a new user with a name and a password. The option is given to enable or disable the user's access to the VDS.

Example Syntax: CreateUser(UserId=< >, Password=< >, LockUser=<true| false>);

AlterUser( )—Modify an existing user account to reset a password or disable/enable user access to the VDS.

Example Syntax: AlterUser(UserId=< >, Password=< >, LockUser=<true| false>);

DropUser( )—Removes a user account from the VDS.

Example Syntax: DropUser(Id=< >);

ShowUsers( )—Returns a row-set containing users and related metadata from the VDS.

Example Syntax: select*from ShowUsers(Ids=<list>);

Role Functions

Descriptions of possible input parameters:

RoleName—a unique name used to identify a role. Usually expressed in terms understood by users. Examples: Sales Manager, Business Administrator, IT Administrator, Sales Representative, etc.

RoleType—different role names can be categorized according to role type. For example, Sales Manager and Sales Representative role names are assigned to the RoleType, Sales.

UserId—a value that uniquely identifies a distinct user in a VDS.

RoleId/RoleIds/Id/Ids—unique keys generated by a VDS to identify a role. The input parameters may take the form of a single value or a list of parameters or any expression that evaluates to one or many.

Below are functions that can be used with above parameters:

CreateRole( )—Creates a new role domain object in the VDS.

Example Syntax: CreateRole(RoleName=< >, RoleType=< >;

AddUserToRole( )—Assigns a user to one or more roles.

Example Syntax: AddUserToRole(UserId=< >, RoleIds=<list>)

AlterRole( )—Modifies metadata for a given role.

Example Syntax: AlterRole(Id=< > [, RoleName=< >, RoleType=< >)

DeleteUserFromRole—Removes a user assignment from a given role.

Example Syntax: DeleteUserFromRole(UserId=< >, RoleId=< >)

DropRole( )—Removes a role domain object from the VDS.

Example Syntax: DropRole(Ids=<list>);

Show Roles( )—Returns a row-set containing all roles and related metadata from the VDS.

Example Syntax: select*from ShowRoles(Ids=< >);

Show RoleAssignments( )—Returns a row-set containing all users assigned to one or more roles.

Example Syntax: select*from ShowRoleAssignment (RoleIds=< >);

Group Functions

Descriptions of Possible Input Parameters:

GroupName—a unique name used to identify a group. Usually expressed in terms understood by users.

Attributes—key value pairs of data expressed in JSON.

GroupId/GroupIds—a value that uniquely identifies a distinct group in a VDS.

EntityId/EntityIds—a value that uniquely identifies a distinct entity in a VDS.

Membership in a group is flexible. Different types of domain objects could be members within a group.

MemberId/MemberIds—a value that uniquely identifies distinct membership in a VDS. A MemberId is a unique value that establishes membership of a given entity to a particular group.

DynamicQuery—used to dynamically identify the entities that are members of a group. Membership is determined when a list of group members is required, not when the member-to-group relationship is created.

Operation—allow for SQL operators, such as UNION, UNION ALL, and INTERSECTION, when working with more than one group. For example, a user may want to identify all the members in Group A and GROUP B. If the call includes Operation, then Expand, ExpandType and ExpandUpOtLevel will be ignored.

Expand—indicates whether groups which are members of a group (a group can contain a group as a member), should be expanded during this operation. For example, group2 could be a member of group1 and when group1 is shown this indicates if all members of group2 should be shown also.

ExpandType—indicates whether expansion results are processed according to UNION or UNION ALL rules governing duplicate removal.

ExpandUpToLevel—is an integer number which represents how deep an expand will occur. For example, 1 indicates that the expansion does not apply to move than the top level group.

Attribute—a value which represents a value associated with a member in addition to any entity attributes which are dynamically associated with the member id. This can also represent a value which should be searched for within the group or expanded list while showing.

Below are functions that can be used with the above parameters:

CreateGroup( )—Creates a new group domain object in the VDS.

Example Syntax: CreateGroup(GroupName=< >, Attributes='{"key1":"value1","key2":"value2"}');

AddGroupMember( )—Establishes entity membership to a group.

Example Syntax: AddGroupMember(GroupId=< >, EntityIds=<list>, DynamicQuery=< >, Attributes='{"key1":"value1","key2":"value2"}');

ClearGroup( )—Removes all member relationships from one or more groups.

Example Syntax: ClearGroup(GroupIds=<list>);

DeleteGroupMember( )—Removes one or more entity membership from a given group.

Example Syntax: DeleteGroupMember(GroupId=< >, MemberIds=<list>);

DropGroup( )—Removes a group domain object from the VDS.

Example Syntax: DropGroup(GroupId=< >);

ShowGroups( )—Returns a row-set containing all groups and related metadata from the VDS.

| |
|---|
| Example Syntax: ShowGroups(Ids=<List>, Operation=<Union\|UnionAll\|Intersection>, ExpandType= <union\|unionAll>, Expand=<true\|false>, ExpandUpToLevel=< >); |

Hierarchy Functions

Descriptions of Possible Input Parameters:

HierarchyName—a unique name used to identify a hierarchy. Usually expressed in terms understood by users.

EffectiveDated—allows for versioning of a hierarchy. That state of a hierarchy can change over time, but some business rules require the state of a hierarchy at a given point in time. For example, a company's organizational chart changes as employees join and depart the company. The accounting team may need to send tax statements to all employees in the organization hierarchy as of December 31 in a given year.

Attributes—key value pairs of data expressed in JSON.

HierarchyId/HierarchyIds—a value that uniquely identifies a distinct hierarchy in a VDS.

EntityId/EntityIds—a value that uniquely identifies a distinct entity in a VDS. Membership in a hierarchy is flexible. Different types of domain objects could be members of a hierarchy. Alternatively, one hierarchy may show relationships between employees, and another is a hierarchy of a company's product catalog.

DynamicQuery—used to dynamically identify the entities that are members of a hierarchy. Membership is determined when a list of group hierarchy is required, not when the member-to-hierarchy relationship is created.

ParentId—In a hierarchy tree, a parent node is a node that has one or more child nodes. The parentId uniquely identifies a parent node.

EffectiveStartInstant—For versioned hierarchies, the Instant data type value indicating when a hierarchy was first effective. Used in conjunction with EffectiveEndInstant to define the range of time a hierarchy was effective.

EffectiveEndInstant—For versioned hierarchies, the Instant data type value indicating when a hierarchy was last effective. Used in conjunction with EffectiveStartInstant to define the range of time a hierarchy was effective.

EffectiveAsOf—Multiple versions of a hierarchy may exist for the same EffectiveStartInstance and EffectiveEndInstant range of time. EffectiveAsOf tracks the historical snapshots of these versions. Each time a change is made to a version, a new version is created with EffectiveAsOf set to the instant the change was made.

Expand—indicates whether groups which are members of a hierarchy (a hierarchy can contain a group as a member), should be expanded during this operation. For example, group2 could be a member of hierarchyl and when hierarchyl is shown this indicates if all members of group2 should be shown also.

ExpandType—indicates whether expansion results are processed according to UNION or UNION ALL rules governing duplicate removal.

ExpandUpToLevel—is an integer number which represents how deep an expand will occur. For example, 1 indicates that the expansion does not apply to move than the top level group.

IsActive—disables a hierarchy for a given EffectiveStartInstance and EffectiveEndInstant range of time. The VDS maintains and does not delete the metadata for inactive hierarchies. An inactive hierarchy can be made active.

MemberId/MemberIds—a value that uniquely identifies distinct membership to a hierarchy in a VDS. A MemberId is a unique value that establishes membership of a given entity to a particular hierarchy.

Attribute—a value which represents a value associated with a member in addition to any entity attributes which are dynamically associated with the member id. This can also represent a value which should be searched for within the hierarchy while showing.

Below are functions that can be used with the above parameters:

CreateHierarchy( )—Defines a new hierarchy in the VDS.

Example Syntax: CreateHierarchy(HierarchyName='<schema>.<Hierarchy_Name>', EffectiveDated=<true|false>, Attributes='{"key1":"value1","key2":"value2"}');

AddHierarchyMember( )—Establishes one or more new child-to-parent node relationships in a hierarchy.

Example Syntax: AddHierarchyMember(HierarchyId=< >, EntityIds=<list> or DynamicQuery='<XSQL query', ParentId=< >, Description=< >, EffectiveStartInstant=< >, EffectiveEndInstant=< >, IsActive=<true|false>, MemberId=< >);

ClearHierarchy( )—removes all parent and child nodes from one or more hierarchies.

Example Syntax: ClearHierarchy(HierarchyIds=<list>);

DeleteHierarchyMember( )—removes one or more child-to-parent node relationships from a hierarchy.

Example Syntax: DeleteHierarchyMember(HierarchyId=< >, MemberIds=<list>);

DropHierarchy( )—removes a hierarchy and all its versions from the VDS.

Example Syntax: DropHierarchy(Ids=<list>);

Show Hierarchy( )—returns

Example Syntax: Select * from ShowHierarchies(HierarchyIds=<List>, Expand=<true|false>, ExpandType<Union|UnionAll>, ParentId=< >, ExpandUpToLevel=< >, EffectiveAsOf=< >);

Show HierarchyChildren( )—Recursively retrieves the child nodes below a given set of member parent nodes within a hierarchy.

Example Syntax: ShowHierarchyChildren(HierarchyId=< >, MemberIds=<list>, EffectiveAsOf=< >);

ShowHierarchyParent( )—Recursively retrieves the parent nodes and above for a given set of member child nodes within a hierarchy.

Example Syntax: ShowHierarchyParent (HierarchyId=< >, MemberIds=<list>, EffectiveAsOf=< >);

UpdateHierarchyMember( )—alters member relationships and other metadata for a given hierarchy.

Example Syntax: UpdateHierarchyMember(HierarchyId=< > , MemberId=< >, Description=< >, EffectiveStartInstant=< >, EffectiveEndInstant=< >, ParentId=< >, IsActive=<true|false>, EffectiveId=< >, Attributes='{"key1":"value1","key2":"value2"}', DynamicQuery=< >, EntityId=< >);

In the foregoing specification, embodiments of the invention have been described with reference to numerous specific details that may vary from implementation to implementation. Accordingly, the specification and drawings are to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method for transacting data with a data repository via a virtual database system, the method comprising:

receiving a query comprising user metadata and a request for transacting data with one or more data repositories;

parsing the query to create a command graph comprising one or more nodes and node-associated metadata, wherein each of the one or more nodes represents a command action for processing or transacting the data, and the node-associated metadata describes a behavior of the command action;

retrieving one or more policy rules based on the user metadata;

applying security policies to the one or more nodes by updating the node-associated metadata;

wherein the security policies are reduced to a canonical form representing a union of access allowances and prohibitions; wherein the one or more policy rules include one or more policy conflict resolution rules based on the user metadata; wherein applying the security policies comprises the prohibitions taking precedence when the one or more policy rules conflict;

updating the command graph based on the updating of the node-associated metadata; and executing each command action corresponding to the one or more nodes of the updated command graph.

2. The method of claim 1, wherein the request for transacting data comprises one or more XSQL commands.

3. The method of claim 1, wherein the request for performing a data transaction includes at least one of a request for uploading the data to the one or more data repositories or a request for downloading the data from the data repository.

4. The method of claim 1, wherein the request for performing a data transaction includes at least one of a request to select the data for download from the data repository, insert the data into the data repository, update the data in the data repository, or delete the data in the data repository.

5. The method of claim 1, wherein the node-associated metadata describes one or more permissions for performing actions associated with the transacting of the data.

6. The method of claim 1, wherein the user metadata includes one or more of roles, groups, or hierarchies for one or more users, and wherein the one or more policy rules determine permissions for performing actions when transacting the data for the one or more users grouped by the one or more of roles, groups, or hierarchies.

7. The method of claim 1, wherein the one or more policy rules include at least one of a row-level access control, a column-level access control, a predicate-based access control, a role-based access control, a group-based access control, a hierarchy-based access control, or a dynamic access control.

8. The method of claim 1, further comprising performing an authentication of a user with the virtual database system, wherein the virtual database system comprises an application programming interface for accessing a plurality of different data repositories.

9. The method of claim 1, further comprising optimizing the updated command graph by reordering the one or more nodes, joining the one or more nodes, or modifying the one or more nodes, wherein the optimizing improves an efficiency of the command actions corresponding to the one or more nodes of the updated command graph without altering a result of the command actions.

10. The method of claim 9, wherein the optimizing further includes obtaining one or more predicate-based access control policies and modifying one or more of the command actions corresponding to the one or more nodes of the updated command graph to incorporate the one or more predicate-based access control policies.

11. The method of claim 9, wherein the optimizing includes processing the updated command graph multiple times until a specified optimization criteria are met.

12. The method of claim 1, wherein the command action for processing or transacting the data comprises one or more XSQL commands, and the method further comprising: updating the one or more XSQL commands based on a data repository associated with the request for transacting data with the one or more data repositories, by at least one of replacing a generic function with a corresponding function specific to the data repository or replacing an abstract table name with a corresponding table name of the data repository.

13. The method of claim 1, further comprising updating the one or more policy rules, wherein updating the one or more policy rules includes at least one of:

creating an allowance policy rule associated with access to a particular data resource for one or more users;

creating a denial policy rule associated with access to a particular data resource for one or more users; or assigning one or more policy rules to one or more users.

14. The method of claim 1, wherein the security policies comprise at least one of allowing an access to data within the one or more data repositories or denying access to data within the one or more data repositories.

15. The method of claim 1, wherein the security policies comprise predicate-based access control, the predicate-based access control is configured to allow access to data within the one or more data repositories based on a positive evaluation of a specific condition.

16. The method of claim 15, wherein the specific condition is configured to allow access to a first set of data within the one or more data repositories, the first set of data having an associated first set of parameters, while denying access to a second set of data within the one or more data repositories, the second set of data having an associated second set of parameters, wherein the first set of parameters is different from the second set of parameters.

17. The method of claim 1, further comprising using a second union of statically and dynamically defined users to apply policies to the command graph for a specific user at the moment a command is submitted.

18. The method of claim 1, further comprising identifying policies for a group of users within a namespace of policy sets and enforcing the policies by dynamically placing policy nodes into the command graph.

19. One or more computer-readable non-transitory storage media storing computer readable programming instructions configured to be executed by one or more processors to perform a method comprising:

receiving a query comprising user metadata and a request for transacting data with one or more data repositories;

parsing the query into a command graph comprising one or more nodes and node-associated metadata, wherein each of the one or more nodes represents a command action for processing or transacting the data, and the node-associated metadata describes a behavior of the command action;

retrieving one or more policy rules based on the user metadata;

applying security policies to the one or more nodes by updating the node-associated metadata;

wherein the security policies are reduced to a canonical form representing a union of access allowances and prohibitions; wherein the one or more policy rules include one or more policy conflict resolution rules based on the user metadata; wherein applying the security policies comprises the prohibitions taking precedence when the one or more policy rules conflict;

updating the command graph based on the updating of the node-associated metadata; and executing each of the command actions corresponding to the one or more nodes of the updated command graph.

* * * * *